United States Patent
Vanderveen et al.

(10) Patent No.: US 9,918,352 B2
(45) Date of Patent: Mar. 13, 2018

(54) VEHICLE-TO-EVERYTHING REATTACH TIMING

(71) Applicant: QUALCOMM Incorporated, San Diego, CA (US)

(72) Inventors: Michaela Vanderveen, Tracy, CA (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/647,754

(22) Filed: Jul. 12, 2017

(65) Prior Publication Data
US 2018/0020496 A1 Jan. 18, 2018

Related U.S. Application Data

(60) Provisional application No. 62/363,077, filed on Jul. 15, 2016.

(51) Int. Cl.
H04W 4/00 (2009.01)
H04W 76/02 (2009.01)
(Continued)

(52) U.S. Cl.
CPC ...... *H04W 76/028* (2013.01); *H04W 36/0011* (2013.01); *H04W 36/32* (2013.01);
(Continued)

(58) Field of Classification Search
CPC . H04W 4/02; H04W 76/028; H04W 36/0011; H04W 36/30; H04W 36/32;
(Continued)

(56) References Cited

U.S. PATENT DOCUMENTS

| | | | |
|---|---|---|---|
| 2004/0180658 A1* | 9/2004 | Uchida | H04W 36/30 455/436 |
| 2008/0117076 A1* | 5/2008 | Klaus | G01D 4/006 340/870.02 |

(Continued)

OTHER PUBLICATIONS

3GPP, "3rd Generation Partnership Project; Technical Specification Group Services and System Aspects; Study on Security Aspect for LTE Support of V2X Services (Release 14)," 3GPP Technical Report, Jul. 2016, 62 pgs., 3GPP TR 33.885 V0.4.0, XP051139503, 3rd Generation Partnership Project, Sophia-Antipolis Valbonne, France.

(Continued)

*Primary Examiner* — Thanh Le
(74) *Attorney, Agent, or Firm* — Holland & Hart LLP; Clint R. Morin

(57) ABSTRACT

Methods, systems, and devices for wireless communication are described. A user equipment (UE) may establish a connection to a base station for wireless communications with a network that supports vehicle based communications. The UE may identify a boundary time for the base station. The boundary time may be associated with a periodic schedule when UEs connected to the base station and participating in the vehicle based communications over the network perform a disconnect procedure and a reattach procedure. The UE may perform the disconnect procedure and the reattach procedure at the boundary time.

30 Claims, 17 Drawing Sheets

(51) Int. Cl.
*H04W 36/32* (2009.01)
*H04W 84/02* (2009.01)
*H04W 36/00* (2009.01)

(52) U.S. Cl.
CPC ............ *H04W 84/02* (2013.01); *H04W 76/02* (2013.01); *H04W 76/027* (2013.01)

(58) Field of Classification Search
CPC ...... H04W 84/02; H04W 4/008; H04L 45/42; H04L 67/14; G01D 4/006
See application file for complete search history.

(56) References Cited

U.S. PATENT DOCUMENTS

| | | | | |
|---|---|---|---|---|
| 2013/0316689 | A1* | 11/2013 | Iwasaki | H04W 4/008 455/418 |
| 2017/0038739 | A1* | 2/2017 | Nakamura | G04R 20/26 |
| 2017/0149660 | A1* | 5/2017 | Shu | H04L 45/42 |

OTHER PUBLICATIONS

HTC, "Resolve FFS for Attach/Detach Solution," 3GPP SA WG2 Meeting #S2-97, S2-131787 (revision of S2-13xxxx3, May 27-31, 2013, Susan, South Korea, 4 pgs., XP050708967, 3rd Generation Partnership Project.

ISA/EP, International Search Report and Written Opinion of the International Searching Authority, Int'l Application No. PCT/US2017/041951, Oct. 19, 2017, European Patent Office, Rijswijk, NL, 18 pgs.

NEC, "Editor's Note Removal and Correction to the Network Assisted Power Saving Soiution," 3GPP SA WG2 Meeting #98, S2-132851 (revision of S2_132837_S2-132474), Jul. 15-19, 2013, Valencia, Spain, 5 pgs., XP050726309, 3rd Generation Partnership Project.

QUALCOMM, "Architectural Considerations due to UE Privacy for V2X Operation," 3GPP SA WG2 Meeting #114, S2-161628, Sophia Antipolis, France, Apr. 11-15, 2016, 7 pgs., XP051086601, 3rd Generation Partnership Project.

QUALCOMM Incorporated, "Adding Details to the Reattach Procedure in Solution 6.5," 3GPP TSG SA WG3 (Security) Meeting #85, S3-162069, Santa Cruz de Tenerife (Spain), Nov. 7-11, 2016, 4 pgs., XP051200305, 3rd Generation Partnership Project.

* cited by examiner

VEHICLE-TO-EVERYTHING REATTACH TIMING

CROSS REFERENCES

The present Application for Patent claims priority to U.S. Provisional Patent Application No. 62/363,077 by Vanderveen, et al., entitled "Vehicle-To-Everything Reattach Timing," filed Jul. 15, 2016, assigned to the assignee hereof.

BACKGROUND

The following relates generally to wireless communication by a vehicle user equipment (v-UE), and more specifically to vehicle-to-everything reattach timing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system or a New Radio (NR) system). A wireless multiple-access communications system may include a number of base stations, each simultaneously supporting communication for multiple communication devices, which may otherwise be known as user equipment (UE).

Wireless communication systems may include or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, (e.g., v-UEs, communicate directly to the network (V2N), to pedestrian UEs (V2P), to infrastructure devices (V2I), and to other v-UEs (e.g., via the network)). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements (e.g., communication requirements, security and privacy requirements, etc.). One such requirement may include a privacy requirement that the cellular wireless communication network is not allowed to track the location of a UE that attaches to the cellular network for the purpose of performing vehicle based communications. For example, the cellular wireless network may not be permitted to use information obtained from a UE attaching to the cellular wireless network for V2X services for the purpose of tracking the UE.

SUMMARY

The described techniques relate to improved methods, systems, devices, or apparatuses that support vehicle-to-everything (V2X) reattach timing procedures. Generally, the described techniques provide for a user equipment (UE), such as a vehicle UE (v-UE) of a vehicle based communication network to perform vehicle based communications that conform to various requirements. For example, the UE may establish a connection to a base station. The UE may conceal its true identify by using a virtual identity to establish the first connection to the base station. The UE may identify a boundary time for the base station. The boundary time may provide an indication of a time that each UE associated with the base station and participating in the vehicle based communications may perform a disconnect and reattach procedure with the base station. The boundary time for the base station may be different from boundary times for other base stations. The UE may determine the boundary time based on a function of the base station identifier, based on signaling received from the base station, based on information received when establishing the first connection to the base station, etc. At substantially the boundary time, the UE may disconnect from the base station and perform a reattach procedure to establish a second connection to the base station. The UE may use a different virtual ID to establish the second connection, thus again concealing its identity. In some cases, each UE that is associated with the base station and participating in a vehicle based communications using the vehicle based communication network may perform the disconnect/reattach procedure with the base station at substantially the boundary time. A disconnect/reattach procedure, such as the one described herein, may be useful in breaking any location-over-time tracking log based on the attach identity.

At the network side, a network entity (e.g., a mobility management entity (MME)) may coordinate with each base station it manages to establish different boundary times for each base station. For example, the network entity may identify which base stations under its control are participating in or support a network for vehicle based communications. These base stations may constitute a set of base stations. The network entity may set a boundary time for each base station in the set of base stations. The network entity may set a different boundary time for each base station in the set of base station. This may control the network load level that would otherwise be generated with UEs performing a disconnect/reattach procedures with every base station at the same time. The network entity may convey an indication to each base station in the set of base stations of its associated boundary time.

A method of wireless communication by a v-UE is described. The method may include establishing a first connection to a base station for wireless communications with a network that supports vehicle based communications, identifying a boundary time associated with the base station, the boundary time associated with a periodic schedule when v-UEs connected to the base station and participating in the vehicle based communication over the network perform a disconnect procedure and a reattach procedure, and performing the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station.

An apparatus for wireless communication by a v-UE is described. The apparatus may include means for establishing a first connection to a base station for wireless communications with a network that supports vehicle based communications, means for identifying a boundary time associated with the base station, the boundary time associated with a periodic schedule when v-UEs connected to the base station and participating in the vehicle based communication over the network perform a disconnect procedure and a reattach procedure, and means for performing the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station.

Another apparatus for wireless communication by a v-UE is described. The apparatus may include a processor, memory in electronic communication with the processor, and instructions stored in the memory. The instructions may be operable to cause the processor to establish a first connection to a base station for wireless communications with a network that supports vehicle based communications, identify a boundary time associated with the base station, the boundary time associated with a periodic schedule when v-UEs connected to the base station and participating in the vehicle based communication over the network perform a disconnect procedure and a reattach procedure, and perform the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station.

A non-transitory computer readable medium for wireless communication by a v-UE is described. The non-transitory computer-readable medium may include instructions operable to cause a processor to establish a first connection to a base station for wireless communications with a network that supports vehicle based communications, identify a boundary time associated with the base station, the boundary time associated with a periodic schedule when v-UEs connected to the base station and participating in the vehicle based communication over the network perform a disconnect procedure and a reattach procedure, and perform the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station.

Some examples of the method, apparatus, and non-transitory computer-readable medium described above may further include processes, features, means, or instructions for identifying a physical cell identifier (PCI) associated with the base station when establishing the first connection. Some examples of the method, apparatus, and non-transitory computer-readable medium described above may further include processes, features, means, or instructions for calculating the boundary time based at least in part on the identified PCI of the base station.

Some examples of the method, apparatus, and non-transitory computer-readable medium described above may further include processes, features, means, or instructions for receiving, from the base station, a timing parameter in a system information block (SIB). Some examples of the method, apparatus, and non-transitory computer-readable medium described above may further include processes, features, means, or instructions for calculating the boundary time based at least in part on the identified PCI and the received timing parameter.

In some examples of the method, apparatus, and non-transitory computer-readable medium described above, the timing parameter comprises an indication of the boundary time or an indication of the periodic schedule associated with the base station.

Some examples of the method, apparatus, and non-transitory computer-readable medium described above may further include processes, features, means, or instructions for receiving a timing parameter in a SIB received from the base station. Some examples of the method, apparatus, and non-transitory computer-readable medium described above may further include processes, features, means, or instructions for identifying the boundary time based at least in part on the received timing parameter.

In some examples of the method, apparatus, and non-transitory computer-readable medium described above, the SIB comprises configuration parameters for the network that supports vehicle based communications. In some examples of the method, apparatus, and non-transitory computer-readable medium described above, the timing parameter comprises an indication of the boundary time and an indication of the periodic schedule associated with the base station.

Some examples of the method, apparatus, and non-transitory computer-readable medium described above may further include processes, features, means, or instructions for performing a radio resource control (RRC) connection procedure with the base station to establish the first connection. Some examples of the method, apparatus, and non-transitory computer-readable medium described above may further include processes, features, means, or instructions for identifying the boundary time based at least in part on an indicator received during the RRC connection procedure.

Some examples of the method, apparatus, and non-transitory computer-readable medium described above may further include processes, features, means, or instructions for receiving the indicator in an information element (IE) conveyed in an RRCConnectionReconfiguration message received during the RRC connection procedure.

In some examples of the method, apparatus, and non-transitory computer-readable medium described above, the indicator comprises a timing parameter associated with the boundary time. In some examples of the method, apparatus, and non-transitory computer-readable medium described above, the timing parameter comprises an indication of the boundary time or an indication of the periodic schedule associated with the base station.

Some examples of the method, apparatus, and non-transitory computer-readable medium described above may further include processes, features, means, or instructions for transmitting an indication to the base station during the RRC connection procedure that the v-UE may be using vehicle based communications over the network.

Some examples of the method, apparatus, and non-transitory computer-readable medium described above may further include processes, features, means, or instructions for using a first virtual v-UE identifier to establish the first connection to the base station. Some examples of the method, apparatus, and non-transitory computer-readable medium described above may further include processes, features, means, or instructions for using a second virtual v-UE identifier to establish the second connection to the base station.

Some examples of the method, apparatus, and non-transitory computer-readable medium described above may further include processes, features, means, or instructions for repeating the disconnect procedure and the reattach procedure at the boundary time in accordance with the periodic schedule. In some examples of the method, apparatus, and non-transitory computer-readable medium described above, a different virtual v-UE identifier may be used for each reattach procedure.

A method of wireless communication by a v-UE is described. The method may include identifying a set of base stations that are associated with a network that supports vehicle based communications, setting a boundary time for each base station of the set of base stations, the boundary time associated with a periodic schedule when v-UEs connected to a respective base station and participating in vehicle based communications over the network perform a disconnect procedure and a reattach procedure, wherein a different boundary time is set for each base station, and conveying, to each base station of the set of base stations, an indication of the boundary time for the base station.

An apparatus for wireless communication by a v-UE is described. The apparatus may include means for identifying a set of base stations that are associated with a network that supports vehicle based communications, means for setting a boundary time for each base station of the set of base stations, the boundary time associated with a periodic schedule when v-UEs connected to a respective base station and participating in vehicle based communications over the network perform a disconnect procedure and a reattach procedure, wherein a different boundary time is set for each base station, and means for conveying, to each base station of the set of base stations, an indication of the boundary time for the base station.

Another apparatus for wireless communication by a v-UE is described. The apparatus may include a processor, memory in electronic communication with the processor, and instructions stored in the memory. The instructions may be operable to cause the processor to identify a set of base stations that are associated with a network that supports vehicle based communications, set a boundary time for each base station of the set of base stations, the boundary time associated with a periodic schedule when v-UEs connected to a respective base station and participating in vehicle based communications over the network perform a disconnect procedure and a reattach procedure, wherein a different boundary time is set for each base station, and convey, to each base station of the set of base stations, an indication of the boundary time for the base station.

A non-transitory computer readable medium for wireless communication by a v-UE is described. The non-transitory computer-readable medium may include instructions operable to cause a processor to identify a set of base stations that are associated with a network that supports vehicle based communications, set a boundary time for each base station of the set of base stations, the boundary time associated with a periodic schedule when v-UEs connected to a respective base station and participating in vehicle based communications over the network perform a disconnect procedure and a reattach procedure, wherein a different boundary time is set for each base station, and convey, to each base station of the set of base stations, an indication of the boundary time for the base station.

Some examples of the method, apparatus, and non-transitory computer-readable medium described above may further include processes, features, means, or instructions for setting a different boundary time for each base station of the set of base stations maintains a load level on the network entity that may be below a threshold load level.

Some examples of the method, apparatus, and non-transitory computer-readable medium described above may further include processes, features, means, or instructions for conveying the indication to each base station of the set of base stations via a backhaul link. In some examples of the method, apparatus, and non-transitory computer-readable medium described above, the backhaul link comprises an S1 link.

DETAILED DESCRIPTION

Figure 1:
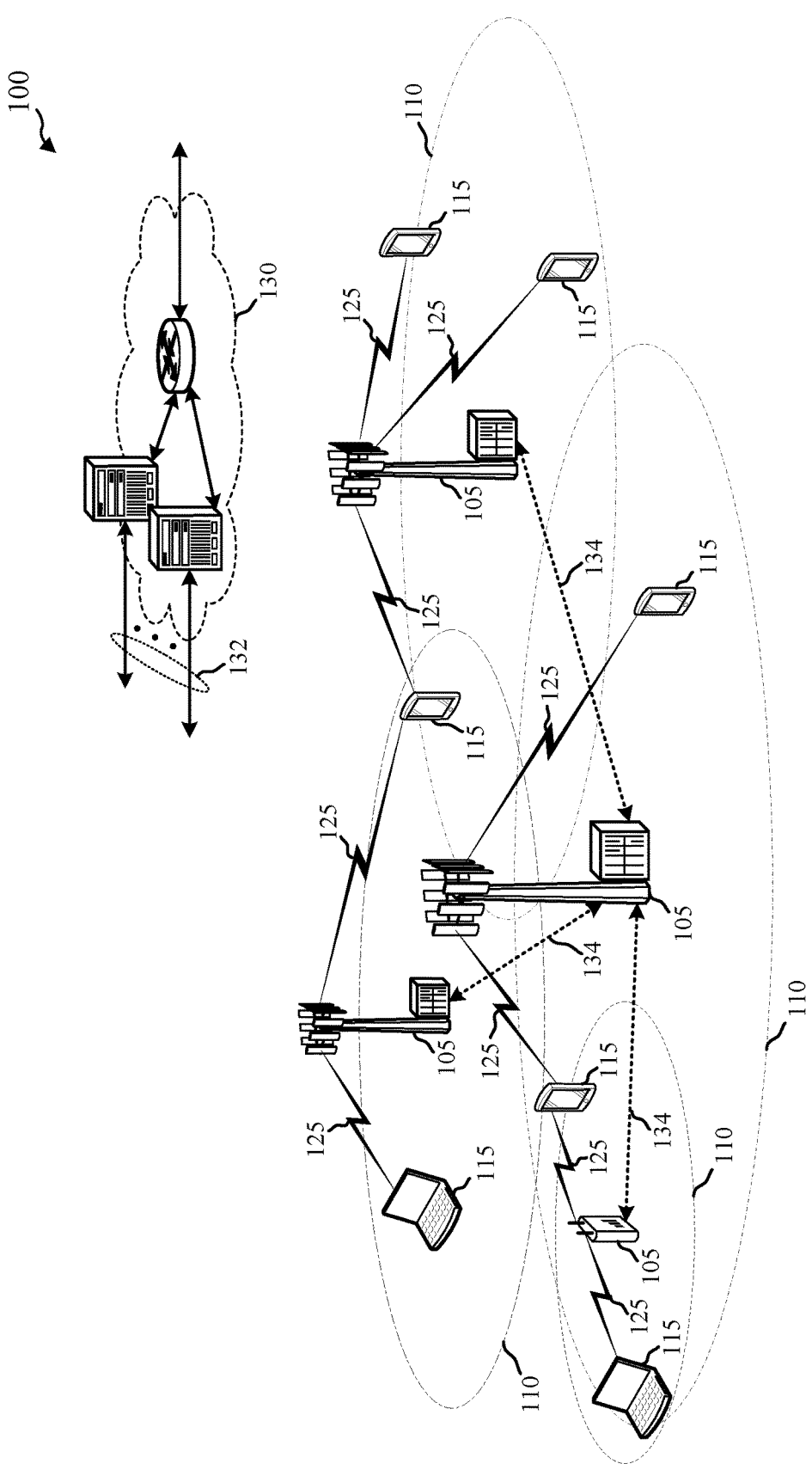
FIG. 1 illustrates an example of a system for wireless communication by a vehicle user equipment (v-UE) that supports vehicle-to-everything reattach timing in accordance with aspects of the present disclosure.

Networks that support vehicle based communications may provide significant improvements to driver assistance systems. Such vehicle based communication networks may be referred to as vehicle-to-everything (V2X) networks, vehicle-to-vehicle (V2V) networks, cellular V2V (C-V2V) networks, etc. Vehicle based communication networks may include user equipments (UEs), also referred to as vehicle UEs (v-UEs), that communicate directly with infrastructure devices (vehicle-to-infrastructure (V2I)), for example, traffic signal timing and priority, etc. The UEs may communicate directly with the network (vehicle-to-network (V2N)), for example, real-time traffic conditions and routing, cloud services, etc. The UEs may also communicate with pedestrian UEs (vehicle-to-pedestrian (V2P)), safety alerts to pedestrians, bicyclists, etc. The UEs may also communicate with other v-UEs for collision avoidance safety systems, etc.

In some examples, vehicle based communication networks may be supported by, or otherwise use aspects of a cellular wireless communications systems (e.g., LTE and/or LTE-advanced (LTE-A) wireless communication systems, which may also be referred to as LTE vehicle (LTE-V) systems). While this may provide numerous advantages, there may be certain configurations and/or requirements for vehicle based communications that may be considered for the LTE-V system. For example, one requirement for vehicle based communications is that the cellular network (e.g., the network operator) may not use data or information gathered from UEs attaching to the network for vehicle based communications to track the location of the UEs. The location information of a UE may be contained in a vehicle based communication. A network may determine where a v-UE is located (to the meter) by looking into the actual data that a v-UE sends on an uplink (Uu link) and knowing the v-UE's cellular identity, which is used to establish the Uu link. Thus, the network may track the v-UE's location over time.

Aspects of the disclosure are initially described in the context of a wireless communications system. For example, a UE, such as a v-UE of a vehicle based communication network may perform vehicle based communications that conform to various requirements. For example, the UE may establish a first connection to a base station. The UE may conceal its identify by using a virtual identity (e.g., an attach identity) to establish the first connection to the base station. Any UE connected may be tracked by the location data it sends using this attach identity. After a while (a short period of time-5 minutes in the art), a UE may be expected to change the identity used to establish the connection to send data on. Thus, the UE remains untrackable beyond this short period. The UE may identify a boundary time for the base station that provides an indication of a time that each UE associated with the base station and participate in the vehicle based communications may perform a disconnect and reattach procedure with the base station. The boundary time for the base station may be different from boundary times for other base stations. The UE may determine the boundary time based on a function of the base station identifier, based on signaling received from the base station, based on information received when establishing the first connection to the base station, etc. At substantially the boundary time, the UE may disconnect from the base station and perform a reattach procedure to establish a second connection to the base station. The UE may use a different virtual ID to establish the second connection, thus again concealing its identity. In some cases, each UE that is associated with the base station and participating in vehicle based communications may perform the disconnect/reattach procedure with the base station at substantially the boundary time. A disconnect/reattach procedure, such as the one described herein, may be useful in breaking any location-over-time tracking log based on the attach identity.

A network entity (e.g., a mobility management entity (MME)) may coordinate with each base station it is associated with to establish different boundary times for each base station. For example, the network entity may identify which base stations it manages that are participating in vehicle based communications (e.g., which base stations have v-UEs attached). These base stations may constitute a set of base stations. The network entity may set a boundary time for each base station in the set of base stations that is different from the boundary times set for other base stations in the set of base station. This may control the network load level that would otherwise be generated with UEs performing a disconnect/reattach procedures with every base station at the same time. The network entity may convey an indication to each base station in the set of base stations of its associated boundary time.

Aspects of the disclosure are further illustrated by and described with reference to apparatus diagrams, system diagrams, and flowcharts that relate to V2X reattach timing.

FIG. 1 illustrates an example of a wireless communications system 100 in accordance with various aspects of the present disclosure. The wireless communications system 100 includes base stations 105, UEs 115, and one or more network entities 130. In some examples, the wireless communications system 100 may be a LTE, LTE-A, or a NR network. In some examples, the wireless communications system 100 may be a network that supports vehicle based communications (e.g., a vehicle based communication network).

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine-type-communication (MTC) device, etc. A UE 115 may also be a v-UE and support vehicle based communications.

Base stations 105 may communicate with the network entity 130 and with one another. For example, base stations 105 may interface with the network entity 130 through backhaul links 132 (e.g., S1, etc.). Base stations 105 may communicate with one another over backhaul links 134 (e.g., X2, etc.) either directly or indirectly (e.g., through network entity 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the network entity 130. A core network of wireless communications system 100 may be an evolved packet core (EPC), which may include at least one MME, at least one serving gateway (S-GW), and at least one packet data network gateway (P-GW). The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS). The network entity 130 may also include a home subscriber server (HSS) that may be used to verify the identity and access level of a UE 115.

The network entity 130 may also monitor, control, or otherwise manage aspects of V2X reattach timing. For example, network entity 130 may identify base stations 105 that are supporting vehicle based communications, for example, those base stations 105 that have UEs 115 attached and performing vehicle based communications. The network entity 130 may identify the vehicle based communication set of base station 105 and set a boundary time for each base station 105. The boundary time may include or be based on a periodic schedule in which the UEs 115 connected to the base station 105 and participating in the vehicle based communications perform a disconnect and reattach procedure. The network entity 130 may set different boundary times for each base station 105 in the set of base stations 105. The network entity 130 may convey an indication to each base station 105 of the boundary time that has been set (e.g., via an S1 link).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include CDMA systems, TDMA systems, FDMA systems, and OFDMA systems. A wireless multiple-access communications system may include a number of base stations, each simultaneously supporting communication for one or more multiple communication devices, which may be otherwise known as a UE.

In some examples, wireless communications system 100 may be a network that supports vehicle based communications (e.g., a vehicle based communication network). The vehicle based communication network may be or use all or a portion of wireless communications system 100 resources for vehicle based wireless communications(e.g., over-the-air resource assignment and control, data and control signaling, etc.). The vehicle based communication network may support V2X communication services and provide for UEs 115 exchanging V2X messages via wireless communications system 100, for example, provide for radio interface (Uu) transport for V2V services. For example, the vehicle based communication network may include aspects of the evolved universal terrestrial access network (E-UTRAN), for example, aspects of an operator network that supports V2X services, as compared to direct-to-direct communication between v-UEs over a PC5 link, for example. In some aspects, the vehicle based communication network may be or support LTE-based V2X services. For V2V communications over wireless communications system 100, V2V messages may be transmitted on the uplink (Uu link) to the network, and the network may rebroadcast the V2V messages on the downlink for receipt by other v-UEs.

A UE 115 may be connected to a base station 105 and participating in vehicle based communications. For example, the UE 115 may establish a first connection to the base station 105 for wireless communications with a network that supports vehicle based communications. The UE 115 may identify a boundary time that is unique to the base station 105. The boundary time may be associated with or based on a periodic schedule when UEs 115 participating in the vehicle based communications (e.g., v-UEs) perform a disconnect and reattach procedure. The UE 115 may perform the disconnect procedure and the reattach procedure substantially at the boundary time. The disconnect procedure may include UE 115 disconnecting or tearing down the first connection with base station 105. The reattach procedure may include UE 115 establishing a second connection with base station 105. The UE 115 may use different identifiers for each connection with the base station (e.g., different attach identifiers).

Figure 2:
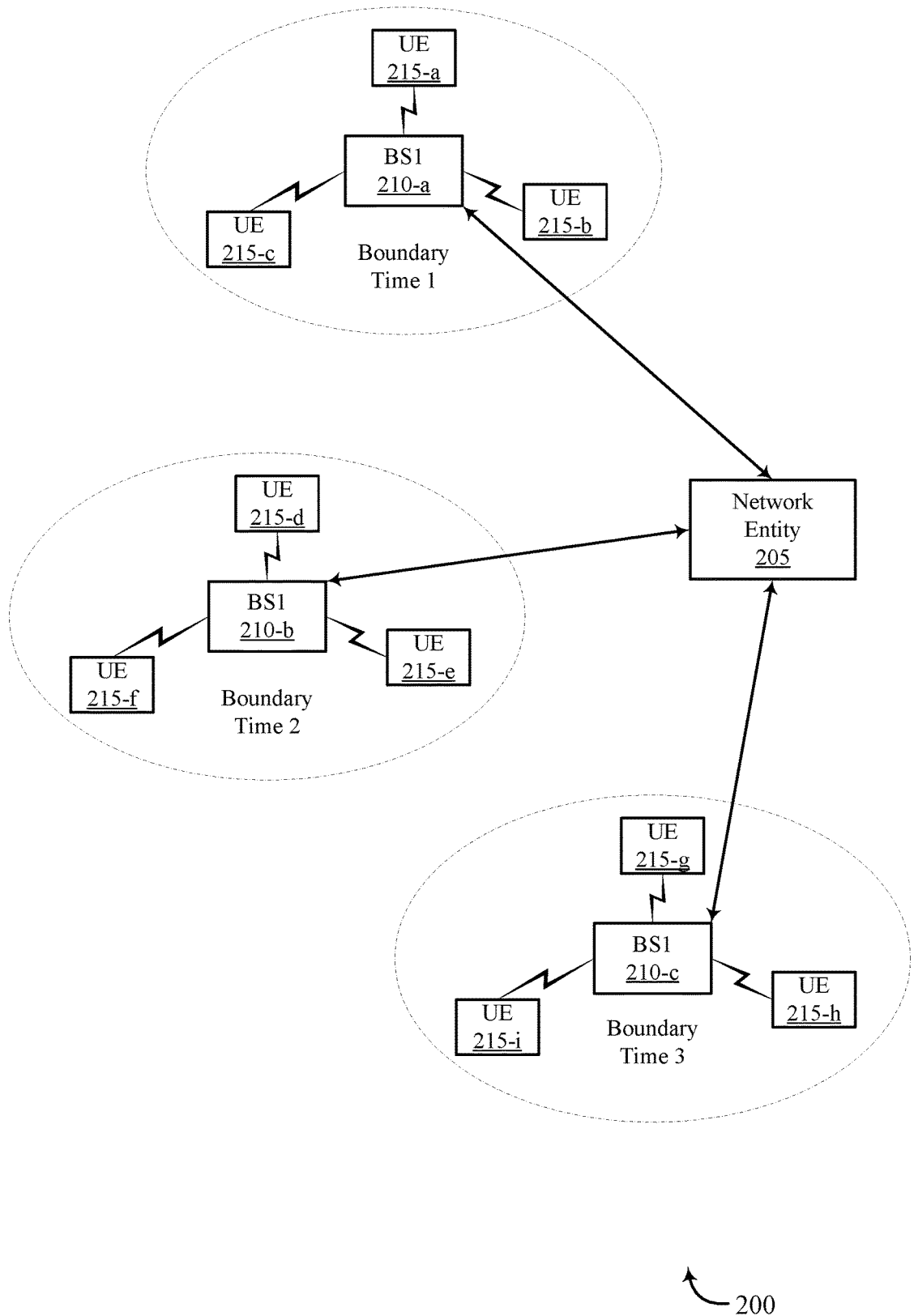
FIG. 2 illustrates an example of a system for wireless communication that supports vehicle-to-everything reattach timing in accordance with aspects of the present disclosure.

FIG. 2 illustrates an example of a wireless communication system 200 for V2X reattach timing. Wireless communication system 200 may implement aspects of wireless communication system 100 of FIG. 1. Wireless communication system 200 may include a network entity 205 that is associated with a set of base stations 210, each base station 210 having UEs 215 participating in vehicle based communications. Network entity 205, base stations 210, and UEs 215 may be examples of the corresponding devices described with reference to FIG. 1.

Wireless communication system 200 may be a network that supports vehicle based communications (e.g., a vehicle based communication network). Wireless communication system 200 may be an example of a cellular wireless communication system (e.g., an LTE, LTE-A, LTE-V wireless communication system) that supports vehicle based communications. In some aspects, supporting vehicle based communications may include supporting V2X communications, V2P communications, V2I communications, and V2V communications. V2V communications may include a UE 215 establishing a connection to the network, for example, a base station 210, to establish a connection (e.g., communication link) in order to send V2V messages via the network (e.g., V2X services). The V2X services may include Uu transport for V2V messages. The Uu transport may include aspects of E-UTRAN provided by an operator network that supports such V2X services. V2V communications may include a UE 215 transmitting messages on the uplink (Uu link) to the base station 210. The base station 210 may rebroadcast the uplink messages on the downlink (e.g., evolved multimedia broadcast multi cast services (eM-BMS)) to other UEs 215 participating in the vehicle based communications.

Although wireless communication system 200 may be a network that supports vehicle based communications, network entity 205 may refrain from tracking the location of UEs 215 that connect to their respective base stations 210 for the purposes of performing vehicle based communications. Moreover, the identity of the UEs 215 connecting for performing vehicle based communications may be hidden from the network entity, e.g., the identity of the UE 215 may be hidden from the mobile network operator. To this end, the UEs 215 may stay attached to a respective base station 210 during the lifetime of one application layer signing key (e.g., five minutes) and may then reattach using a new identity. However, the load level on the network entity 205 may be considerable if each UE 215 participating in the vehicle based communications attempts to reattach at the same time. For example, the network entity 205 may experience a peak in load level when the reattach procedures for a group of base stations 210 are synchronized at a particular time. Alternatively, the network entity 205 may experience a more uniform load level over time by spreading the reattach procedures for the group of base stations 210 over time. Aspects of the present disclosure provide for base stations 210 to use different boundary times to control when their respective UEs 215 perform reattach procedures to control the network load level over time.

Broadly, wireless communication system 200 may address network load leveling by configuring each base station 210 to do its reattach procedure with its associated v-UEs at a different time from other base stations 210. To this end, a boundary time may be determined for each base station 210, which provides an indication of when the v-UEs perform the reattach procedure. The boundary time may be signaled in dedicated radio resource control (RRC) signaling, signaled in system information block(s) (SIB), and/or inferred/derived by the v-UEs from information included in SIBs from base stations 210.

Thus, wireless communication system 200 may include network entity 205 that is associated with multiple base stations 210, with three base stations 210-a, 210-b, and 210-c being shown by way of example. However, it can be appreciated that network entity 205 may be associated with more than three base stations 210. Each of base station 210-a, 210-b, and 210-c may have multiple UEs 215 attached. For example, base station 210-a may have UEs 215-a, 215-b, and 215-c attached, base station 210-b may have UEs 215-d, 215-e, and 215-f attached, and base station 210-c may have UEs 215-g, 215-h, and 215-i attached. The UEs 215 may have established a connection with their respective base stations 210 because wireless communication system is a network that supports vehicle based communications.

Network entity 205 may identify a set of base stations 210 that includes base stations that support vehicle based communications. For example, network entity 205 may identify base stations 210-a, 210-b, and 210-c as the set of base stations 210 because each base station 210 has a UE 215 that has connected for vehicle based communications. Network entity 205 may set a boundary time for each base station 210 of the set of base stations 210. Broadly, the boundary time may be based on a periodic schedule when UEs 215 that are connected to a respective base station 210 and participating in vehicle based communications perform a disconnect procedure and a reattach procedure. Network entity 205 may set a different boundary time for each base station 210 in the set of base stations 210. The periodic schedule may include a boundary time that occurs once during each period of the periodic schedule and, thus, may establish a repeating schedule for the disconnect and reattach procedures occurring at each base station 210.

In some aspects, the boundary time may include a time at which the UEs 215 are to perform the disconnect and reattach procedure for the base station 210, e.g., a fixed system time. The boundary time may have a margin of error that is indicated or known, e.g., +/−x milliseconds, where x is a positive number. In some aspects, the boundary time may include a time window in which the UEs 215 are to perform the disconnect and reattach procedure for the base station 210, e.g., a time window of x seconds, milliseconds, etc. In some aspects, the boundary time may include a subframe in which the UEs 215 are to perform the disconnect and reattach procedure for the base station 210, e.g., a particular subframe number. In some aspects, the boundary time may include a window of subframes in which the UEs 215 are to perform the disconnect and reattach procedure for the base station 210. In some aspects, the boundary time may be based on a counter used for the UEs 215 are to perform the disconnect and reattach procedure for the base station 210.

In some aspects, the boundary time may each instance of the periodic schedule. For example, one instance of the boundary time may be once every minute, every five minutes, or some other fixed time boundary. In some aspects, the periodic schedule set for the base stations 210 in the set of base stations 210 may be different for each base station 210, e.g., base station 210-a may have a periodic schedule of m, base station 210-b may have a periodic schedule of n, and base station 210 may have a periodic schedule of o.

Network entity 205 may convey an indication to each base station 210 of the boundary time that has been set for the base station 210, e.g., via a backhaul link such as an S1 link. For example, the network entity 205 may convey an indication to base station 210-a of boundary time 1, an indication to base station 210-b of boundary time 2, and an indication to base station 210-c of boundary time 3. Boundary times 1, 2, and 3 may be different with respect to each other. Thus, network entity 205 use the different boundary times for each base station 210 to maintain a load level that is below a threshold level for the network entity 205.

UEs 215 may establish connections to their respective base stations 210 for wireless communications with a network that supports vehicle based communications. For example, UEs 215-a, 215-b, and 215-c may establish connections with base station 210-a, UEs 215-d, 215-e, and 215-f may establish connections with base station 210-b, and so on.

The UEs 215 may identify the boundary time associated with their respective bases station. For example, UEs 215-a, 215-b, and 215-c may identify boundary time 1 associated with base station 210-a, UEs 215-d, 215-e, and 215-f may identify boundary time 2 associated with base station 210-b, and so on. The UEs 215 may determine that the boundary time is associated with the periodic schedule in which the UEs 215 connected to the base station 210 and participating in vehicle based communications over the network are to perform a disconnect procedure and a reattach procedure. Broadly, the UEs 215 may identify the boundary times by inference, e.g., the boundary time is a functions of a timing parameter and the identity of the base station 210, based on dedicated signaling from the base station 210, e.g., a SIB that is associated with vehicle based communications, and/or may be provided to the UE 215 during an initial attach procedure, e.g., during a RRC connection setup procedure.

In some cases, the UE 215 may identify a physical cell identifier (PCI) that is associated with the base station during an initial connection establishment, e.g., during establishment of the first connection. The PCI may be associated with an identity of the base station 210 that the UE 215 is establishing the connection with. The UE 215 may also receive a timing parameter from the base station 210, e.g., receive the timing parameter in a SIB from base station 210. The timing parameter may include or convey an indication of the boundary time and/or an indication of the periodic schedule associated with the base station 210. In one example, the UE 215 may calculate the boundary time associated with the base station 210 using the PCI of the base station 210, e.g., using the function (boundary_time=timing_parameter mod (hash(PCI) mod 60) and estimating that reattaching all UEs served by an eNB may take about 5 seconds.

In some cases, a new SIB may be established for a network that supports vehicle based communications. For example, the SIB may include various configuration parameters for the network that supports vehicle based communications. In some examples, the SIB may include the timing parameter, e.g., an indication of the boundary time and/or the periodic schedule for the base station 210. The UE 215 may calculate or otherwise identify the boundary time based on the timing parameter received in the SIB.

In some cases, the UE 215 may perform an RRC connection procedure to establish the initial connection with the base station 210. The RRC connection procedure may include the exchange of various messages, e.g., RRCConnectionReconfiguration message, RRCConnectionReconfigurationComplete message, etc. In some cases, an indicator such as an information element (IE) may be received in a message from the base station 210 during the RRC connection procedure that conveys information associated with the boundary parameter, e.g., a timing parameter which may include an indication of the boundary time or an indication of the periodic schedule for the base station 210. In some cases, the UE 215 may transmit an indication to the base station 210 during the RRC connection procedure that the UE 215 is establishing the connection to the base station for wireless communications in a network that supports vehicle based communications. For example, the UE 215 may include an IE in one message exchanged during the RRC connection procedure that conveys the indication.

Each of the UEs 215 that are associated with a particular base station 210 may perform the disconnect procedure and reattach procedure with the base station 210 at substantially the boundary time. For example, UEs 215-*a*, 215-*b*, and 215-*c* may perform the disconnect/reattach procedures with base station 210-*a* at boundary time 1, UEs 215-*d*, 215-*e*, and 215-*f* may perform the disconnect/reattach procedures with base station 210-*b* at boundary time 2, and so on. The disconnect procedure may include the UE 215 disconnecting or tearing down the first connection established with base station 210. The reattach procedure may include the UE 215 establishing a second connection with the base station 210. The second connection may again be established for wireless communications in a network that supports vehicle based communications. The second connection may also be to a different base station than the first connection, e.g., when the UE 215 has moved to the coverage are of a new base station and continues to participate in vehicle based communications.

In some cases, the UEs 215 may conceal their real identity when connected to the base stations 210 for vehicle based communications. For example, each UE 215 may use a virtual or reattach identifier to establish the first connection and then use a different virtual or reattach identifier to establish the second connection to the base station 210. As can be appreciated, the UEs 215 may repeat the disconnect procedure and reattach procedure at the boundary time in accordance with the periodic schedule (e.g., at the boundary time for each period in the periodic schedule). The UEs 215 may use a different virtual or reattach identifier for each reattach procedure to conceal the UE 215 real identity.

Accordingly, wireless communication system 200 may support vehicle based communications where each UE 215 associated with a base station 210 will disconnect and reattach to the base station 210 at substantially the same time, but at different times than UEs 215 associated with other base stations 210. This may prevent network tracking of the UEs 215 and may spread the load associated with the reattach procedures over time. UEs 215 may each include a UE-based clock that may be used for the timing of the disconnect/reattach procedures at the boundary times.

Figure 3:
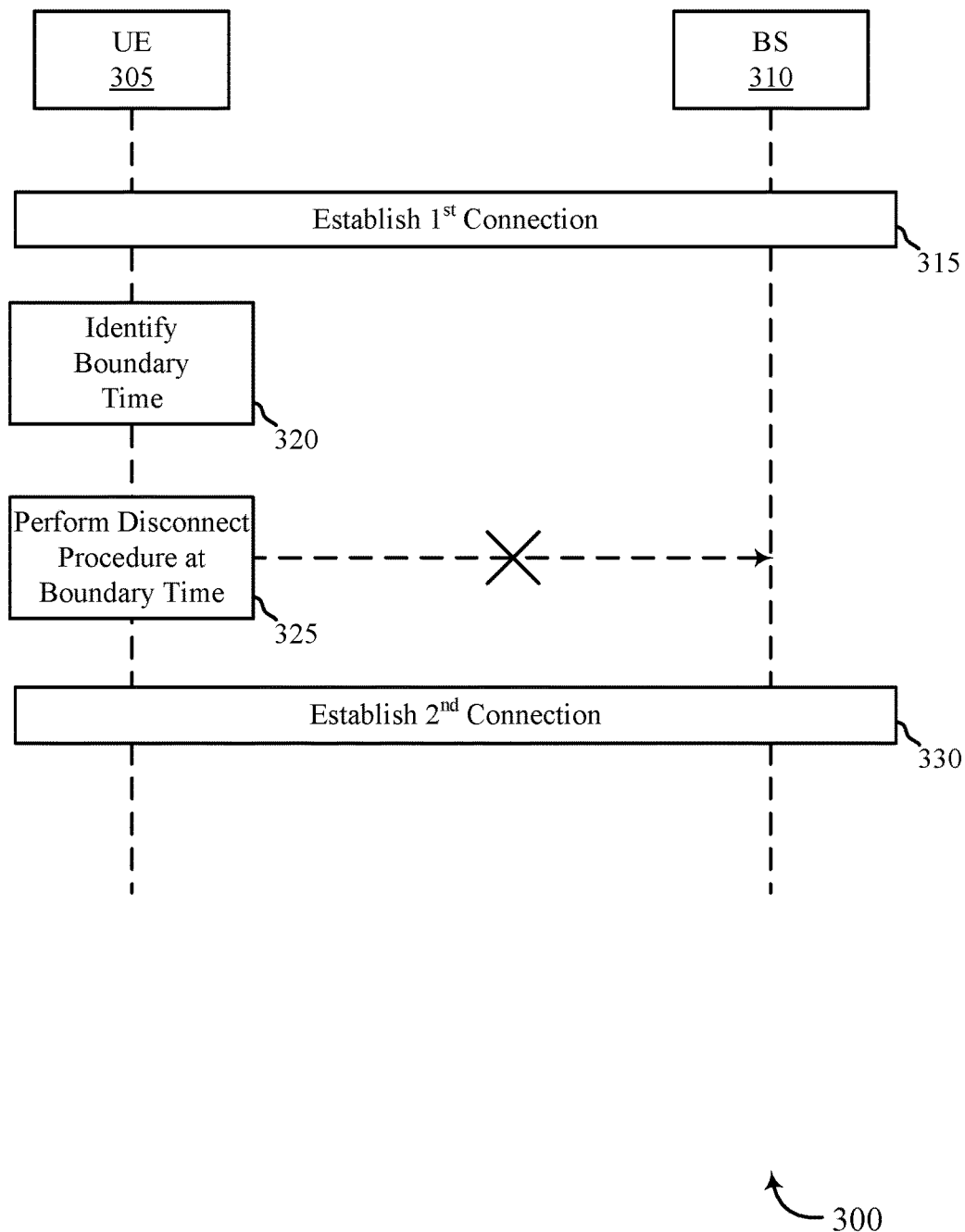
FIG. 3 illustrates an example of a process flow that supports vehicle-to-everything reattach timing in accordance with aspects of the present disclosure.

FIG. 3 illustrates an example of a process flow 300 for V2X reattach timing. Process flow 300 may be implemented by aspects of wireless communication systems 100 and 200 of FIGS. 1 and 2. Process flow 300 may include a UE 305 and a base station 310, which may be examples of the corresponding devices of FIGS. 1 and 2.

At 315, UE 305 may establish a first connection with base station 310. The first connection may be established for wireless communications with a network that supports vehicle based communications. Establishing the first connection may include performing an RRC connection procedure where the UE 305 receives information associated with a boundary time for the base station 310, e.g., a timing parameter, a PCI, etc. The UE 305 may use a virtual identifier to establish the first connection with the base station 310, e.g., to conceal the real identity of the UE 305.

At 320, UE 305 may identify a boundary time associated with base station 310. The boundary time may be associated with a periodic schedule for base station 310 where UEs (such as UE 305) that are connected to base station 310 and participating in vehicle based communications over the network perform a disconnect procedure and a reattach procedure. The UE 305 may identify the boundary time based on a function of the PCI/timing parameter received from the base station 310, based on dedicated signaling received from the base station 310 (e.g., a SIB associated with vehicle based communications), and/or based on information received during a RRC connection procedure used to establish the first connection.

At 325, UE 305 may perform a disconnect procedure with base station 310 at the boundary time. Performing the disconnect procedure at the boundary time may include disconnecting from the base station 310 at a fixed time, within a time window, during a predetermined subframe, during a window of available subframes, etc. The disconnect procedure may include the UE 305 disconnecting the first connection to the base station 310, e.g., tearing down the first connection with the base station.

At 330, UE 305 may establish a reattach procedure with base station 310 to establish a second connection. The reattach procedure may be performed at the boundary time. The reattach procedure may include the UE 305 establishing the second connection with the base station 310 at the boundary time, e.g., at the fixed time, in the time window, etc. The UE 305 may use a different virtual identifier to establish the second connection with the base station 310, e.g., different from the virtual identifier used to establish the first connection. Thus, the UE 305 may continue to conceal the real identity of the UE 305 across multiple connections with base station 310. This may also support prevention of the network from tracking the UE 305 when the UE 305 connects to base station 310 for wireless communications with the network that supports vehicle based communications.

Figure 4:
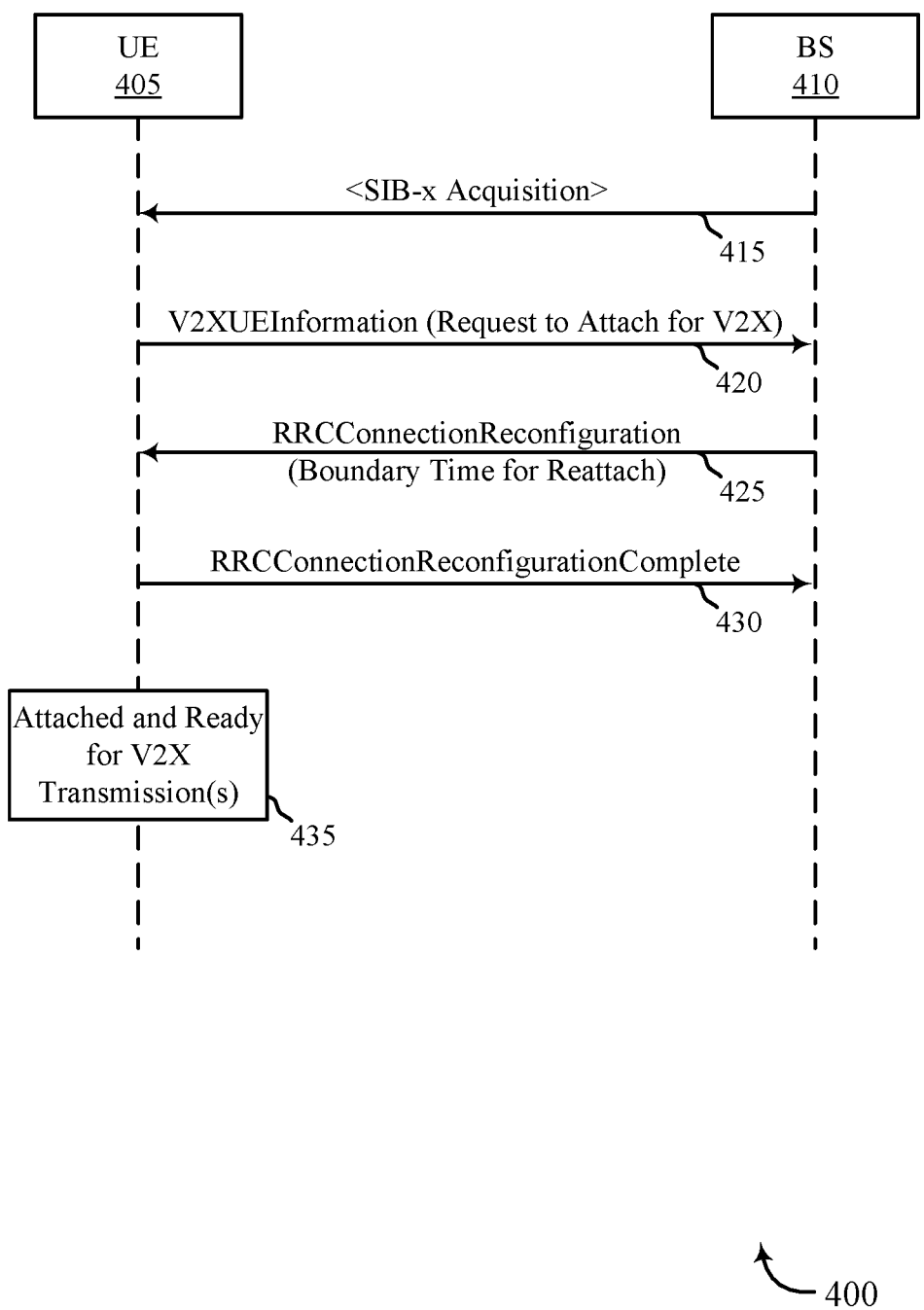
FIG. 4 illustrates an example of a process flow that supports vehicle-to-everything reattach timing in accordance with aspects of the present disclosure.

FIG. 4 illustrates an example of a process flow 400 for V2X reattach timing. Process flow 400 may be implemented by aspects of wireless communication systems 100 and 200 of FIGS. 1 and 2. Process flow 400 may implement aspects of process flow 300 of FIG. 3. Process flow 400 may include a UE 405 and a base station 410, which may be examples of the corresponding devices of FIGS. 1 through 3.

At 415, UE 405 may receive a SIB message from base station 410. The SIB message may be an existing SIB message that includes an IE associated with vehicle based communications. In one example, the SIB message may be a SIB 16 message. At 420, the UE 405 may transmit a request to attach message to base station 410. The request to attach message may include a V2XUEInformation element that conveys an indication that the UE 405 is requesting to establish the connection for wireless communications on a network that supports vehicle based communications.

At 425, the base station 410 may transmit a RRC connection reconfiguration message to UE 405. The RRC connection reconfiguration message may be a part of a RRC connection procedure between UE 405 and base station 410. The RRC connection reconfiguration message may include an indicator associated with the boundary time used for the disconnect and reattach procedure. For example, the RRC connection reconfiguration message may include a timing parameter and/or an indication of the boundary time. At 430, the UE 405 may transmit a RRC connection reconfiguration complete message to base station 410 to establish the first connection with base station 410. The UE 405 may identify the boundary time associated with base station 410 based on the indication received in the RRC connection reconfiguration message. At 435, the UE 405 may be connected to base station 410 and prepared for wireless communications on a network that supports vehicle based communications.

Figure 5:
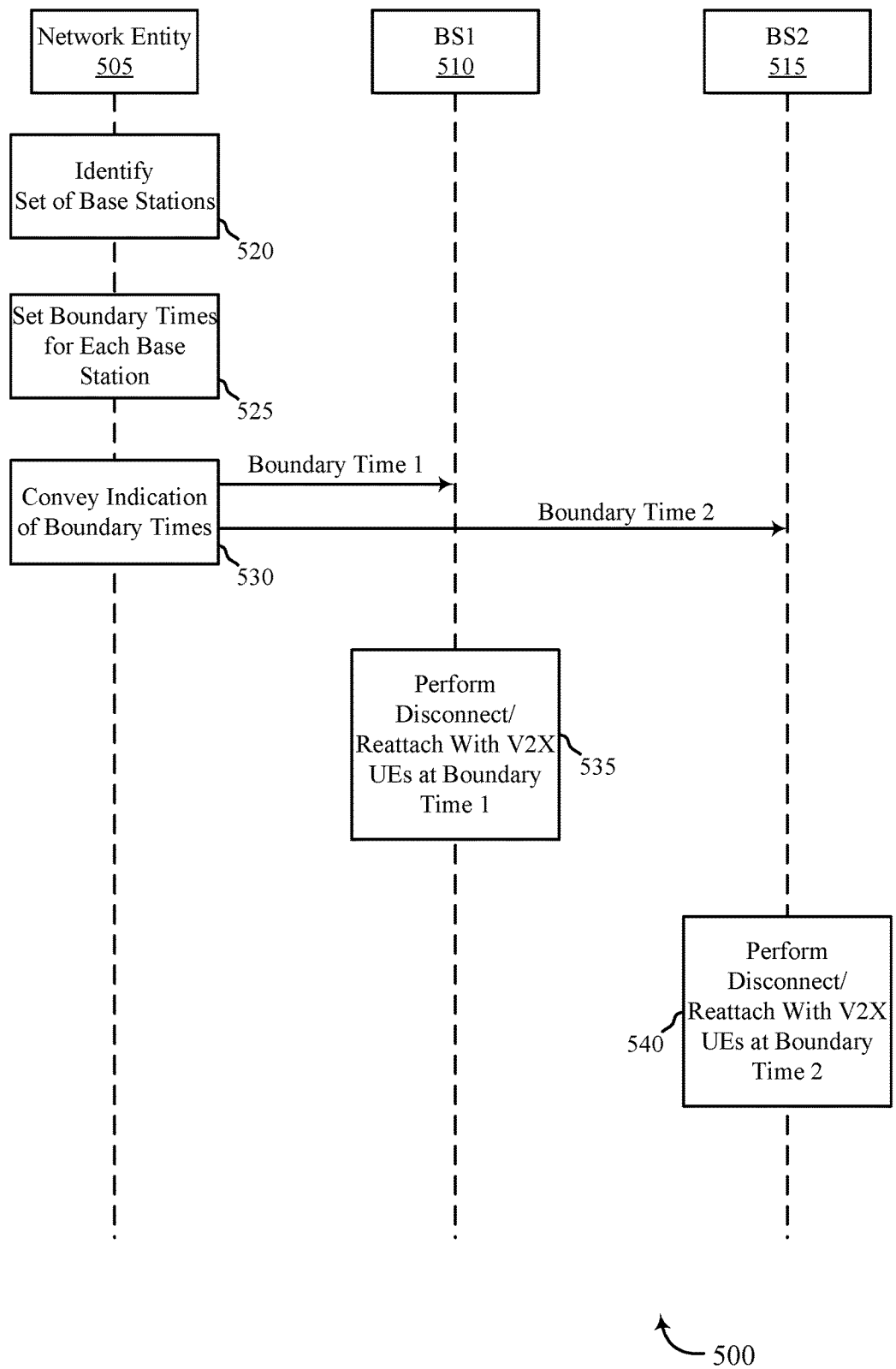
FIG. 5 illustrates an example of a process flow that supports vehicle-to-everything reattach timing in accordance with aspects of the present disclosure.

FIG. 5 illustrates an example of a process flow 500 for V2X reattach timing. Process flow 500 may be implemented by aspects of wireless communication systems 100 and 200 of FIGS. 1 and 2. Process flow 500 may implement aspects of process flows 300 or 400 of FIGS. 3 and 4. Process flow 500 may include a network entity 505, a first base station 510 and a second base station, which may be examples of the corresponding devices of FIGS. 1 through 4.

At 520, network entity 505 may identify a set of base stations. The base stations in the set of base stations may be base stations that are used for wireless communications in a network that supports vehicle based communications. The set of base stations may include first base station 510 and second base station 515. At 525, network entity 505 may set boundary times for each base station in the set of base stations. The network entity 505 may set different times for each base station in the set of base stations. For example, network entity 505 may set of first boundary time for the first base station 510 and set a second boundary time for the second base station 515. The first boundary time may be different than the second boundary time. The boundary times may be based on or otherwise associated with a periodic schedule in which UEs attached to the base stations for vehicle based communications perform a disconnect and reattach procedure.

At 530, network entity 505 may transmit an indication to the base stations of the selected boundary times. For example, network entity 505 may transmit an indication of the first boundary time to the first base station 510 and transmit an indication of the second boundary time to the second base station 515. The network entity 505 may transmit the indications over a backhaul link, such as an S1 link.

At 535, the UEs attached to the first base station 510 for vehicle based communications may perform the disconnect and reattach procedures at the first boundary time, as is discussed with reference to FIGS. 1 through 4. Similarly, at 540 the UEs attached to the second base station 515 for vehicle based communications may perform the disconnect and reattach procedures at the second boundary time.

Figure 6:
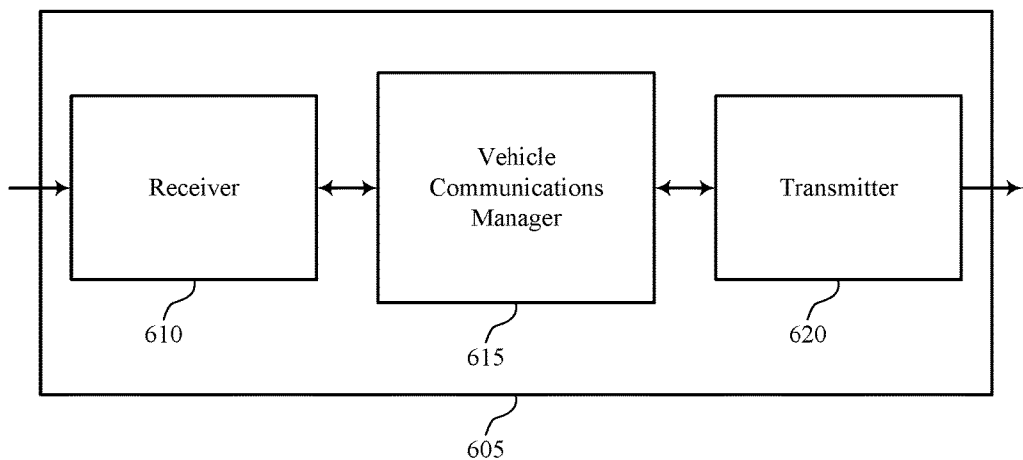
FIGS. 6 through 8 show block diagrams of a device that supports vehicle-to-everything reattach timing in accordance with aspects of the present disclosure.

FIG. 6 shows a block diagram 600 of a wireless device 605 that supports V2X reattach timing in accordance with various aspects of the present disclosure. Wireless device 605 may be an example of aspects of a UE 115 as described with reference to FIGS. 1 through 5. Wireless device 605 may include receiver 610, UE vehicle communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to V2X reattach timing, etc.). Information may be passed on to other components of the device. The receiver 610 may be an example of aspects of the transceiver 935 described with reference to FIG. 9.

UE vehicle communications manager 615 may be an example of aspects of the UE vehicle communications manager 915 described with reference to FIG. 9. UE vehicle communications manager 615 may establish a first connection to a base station for wireless communications with a network that supports vehicle based communications, identify a boundary time associated with the base station, the boundary time associated with a periodic schedule when v-UEs connected to the base station and participating in the vehicle based communication over the network perform a disconnect procedure and a reattach procedure, and perform the disconnect procedure and the reattach procedure substantially at the boundary time in accordance with the periodic schedule, where the disconnect procedure includes the v-UE disconnecting the first connection to the base station and the reattach procedure includes the v-UE establishing a second connection to the base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
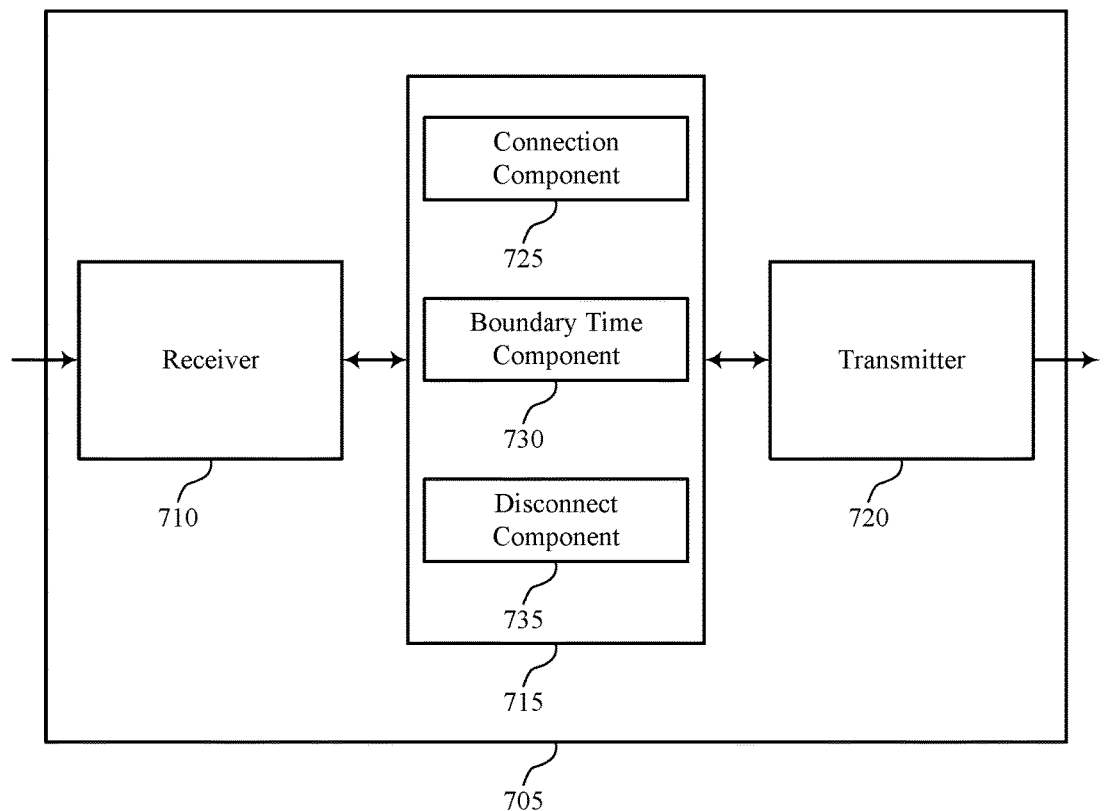

FIG. 7 shows a block diagram 700 of a wireless device 705 that supports V2X reattach timing in accordance with various aspects of the present disclosure. Wireless device 705 may be an example of aspects of a wireless device 605 or a UE 115 as described with reference to FIGS. 1 through 6. Wireless device 705 may include receiver 710, UE vehicle communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to V2X reattach timing, etc.). Information may be passed on to other components of the device. The receiver 710 may be an example of aspects of the transceiver 935 described with reference to FIG. 9.

UE vehicle communications manager 715 may be an example of aspects of the UE vehicle communications manager 915 described with reference to FIG. 9. UE vehicle communications manager 715 may also include connection component 725, boundary time component 730, and disconnect component 735.

Connection component 725 may establish a first connection to a base station for wireless communications with a network that supports vehicle based communications, perform a RRC connection procedure with the base station to establish the first connection, receive the indicator in an IE conveyed in an RRCConnectionReconfiguration message received during the RRC connection procedure, use a first virtual v-UE identifier to establish the first connection to the base station, and use a second virtual v-UE identifier to establish the second connection to the base station. In some cases, the indicator includes a timing parameter associated with the boundary time. In some cases, a different virtual v-UE identifier is used for each reattach procedure.

Boundary time component 730 may identify a boundary time associated with the base station, the boundary time associated with a periodic schedule when v-UEs connected to the base station and participating in the vehicle based communication over the network perform a disconnect procedure and a reattach procedure, calculate the boundary time based on the identified PCI of the base station, calculate the boundary time based on the identified PCI and the received timing parameter, identify the boundary time based on the received timing parameter, and identify the boundary time based on an indicator received during the RRC connection procedure.

Disconnect component 735 may perform the disconnect procedure and the reattach procedure substantially at the boundary time in accordance with the periodic schedule, where the disconnect procedure includes the v-UE disconnecting the first connection to the base station and the reattach procedure includes the v-UE establishing a second connection to the base station and repeat the disconnect procedure and the reattach procedure at the boundary time in accordance with the periodic schedule.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
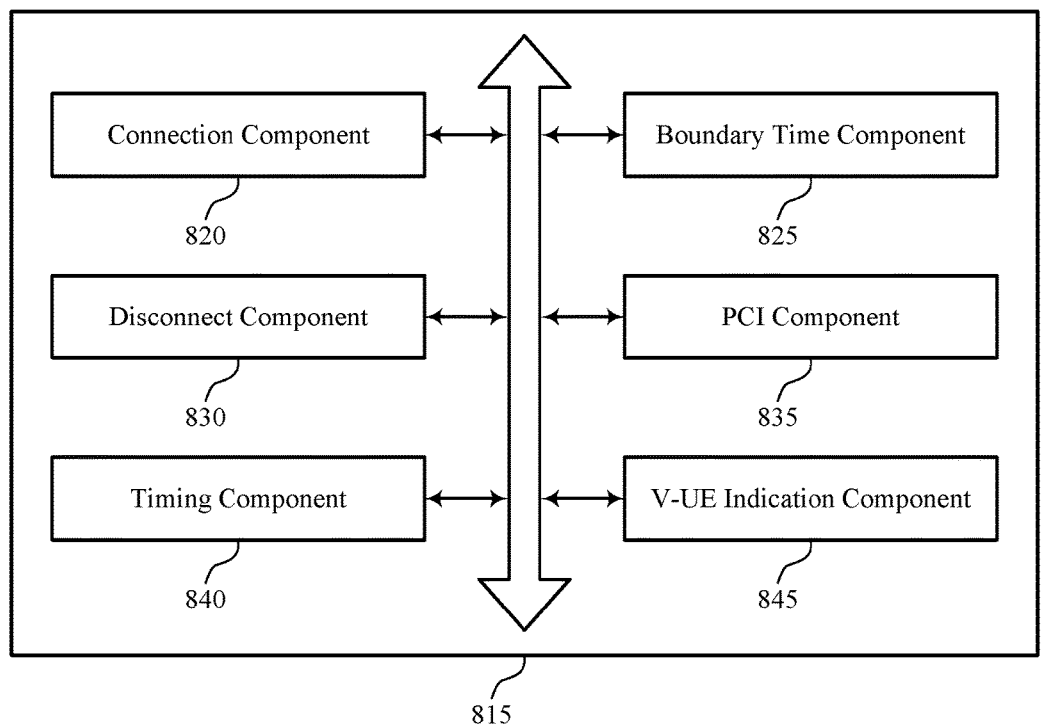

FIG. 8 shows a block diagram 800 of a UE vehicle communications manager 815 that supports V2X reattach timing in accordance with various aspects of the present disclosure. The UE vehicle communications manager 815 may be an example of aspects of a UE vehicle communications manager 615, a UE vehicle communications manager 715, or a UE vehicle communications manager 915 described with reference to FIGS. 6, 7, and 9. The UE vehicle communications manager 815 may include connection component 820, boundary time component 825, disconnect component 830, PCI component 835, timing component 840, and v-UE indication component 845. Each of these modules may communicate, directly or indirectly, with one another (e.g., via one or more buses).

Connection component 820 may establish a first connection to a base station for wireless communications with a network that supports vehicle based communications, perform a RRC connection procedure with the base station to establish the first connection, receive the indicator in an IE conveyed in an RRCConnectionReconfiguration message received during the RRC connection procedure, use a first virtual v-UE identifier to establish the first connection to the base station, and use a second virtual v-UE identifier to establish the second connection to the base station.

Boundary time component 825 may identify a boundary time associated with the base station, the boundary time associated with a periodic schedule when v-UEs connected to the base station and participating in the vehicle based communication over the network perform a disconnect procedure and a reattach procedure, calculate the boundary time based on the identified PCI of the base station, calculate the boundary time based on the identified PCI and the received timing parameter, identify the boundary time based on the received timing parameter, and identify the boundary time based on an indicator received during the RRC connection procedure.

Disconnect component 830 may perform the disconnect procedure and the reattach procedure substantially at the boundary time in accordance with the periodic schedule, where the disconnect procedure includes the v-UE disconnecting the first connection to the base station and the reattach procedure includes the v-UE establishing a second connection to the base station and repeat the disconnect procedure and the reattach procedure at the boundary time in accordance with the periodic schedule.

PCI component 835 may identify a PCI associated with the base station when establishing the first connection.

Timing component 840 may receive, from the base station, a timing parameter in a SIB. In some cases, the timing parameter includes an indication of the boundary time or an indication of the periodic schedule associated with the base station. In some cases, the SIB includes configuration parameters for the network that supports vehicle based communications. In some cases, the timing parameter includes an indication of the boundary time and an indication of the periodic schedule associated with the base station. In some cases, the timing parameter includes an indication of the boundary time or an indication of the periodic schedule associated with the base station.

V-UE indication component 845 may transmit an indication to the base station during the RRC connection procedure that the v-UE is using vehicle based communications over the network.

Figure 9:
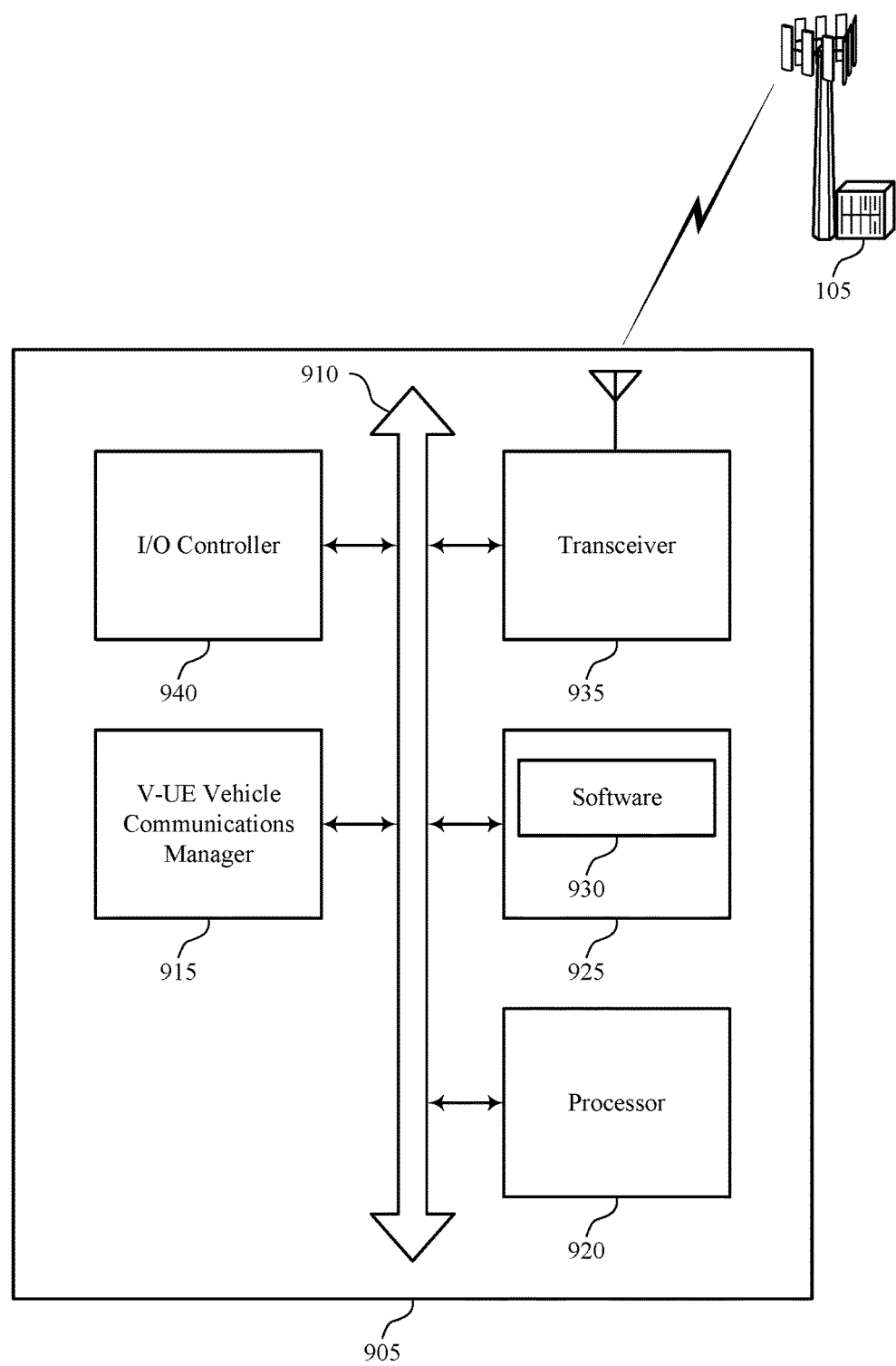
FIG. 9 illustrates a block diagram of a system including a UE that supports vehicle-to-everything reattach timing in accordance with aspects of the present disclosure.

FIG. 9 shows a diagram of a system 900 including a device 905 that supports V2X reattach timing in accordance with various aspects of the present disclosure. Device 905 may be an example of or include the components of wireless device 605, wireless device 705, or a UE 115 as described above, e.g., with reference to FIGS. 1 through 7. Device 905 may include components for bi-directional voice and data communications including components for transmitting and receiving communications, including UE vehicle communications manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting V2X reattach timing).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a Basic Input-Output system (BIOS) which may control basic hardware and/or software operation such as the interaction with peripheral components or devices.

Software 930 may include code to implement aspects of the present disclosure, including code to support V2X reattach timing. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
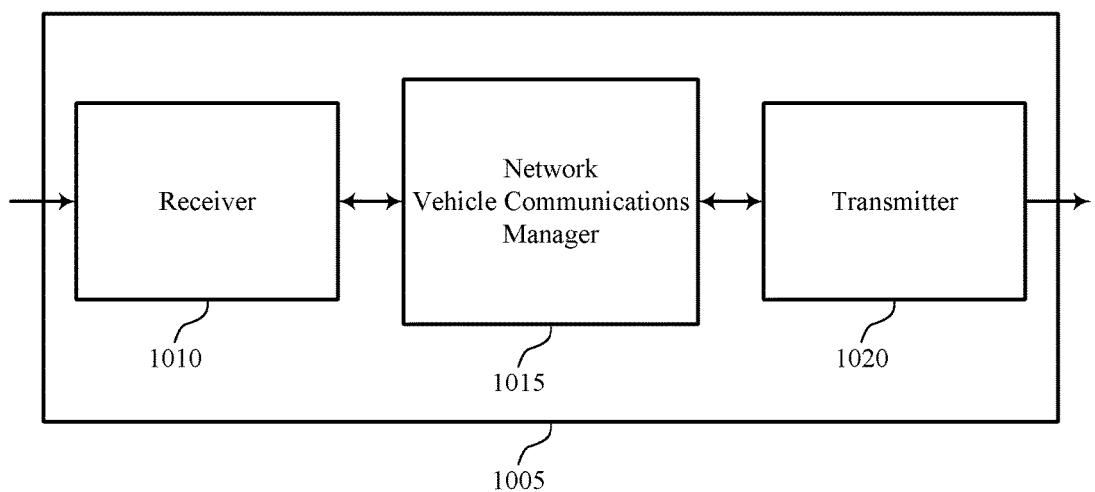
FIGS. 10 through 12 show block diagrams of a device that supports vehicle-to-everything reattach timing in accordance with aspects of the present disclosure.

FIG. 10 shows a block diagram 1000 of a wireless device 1005 that supports V2X reattach timing in accordance with various aspects of the present disclosure. Wireless device 1005 may be an example of aspects of a network entity 130 as described with reference to FIGS. 1 through 5. Wireless device 1005 may include receiver 1010, network vehicle communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to V2X reattach timing, etc.). Information may be passed on to other components of the device. The receiver 1010 may be an example of aspects of the transceiver 1335 described with reference to FIG. 13.

Network vehicle communications manager 1015 may be an example of aspects of the Network vehicle communications manager 1315 described with reference to FIG. 13.

Network vehicle communications manager 1015 may identify a set of base stations that are associated with a network that supports vehicle based communications, set a boundary time for each base station of the set of base stations, the boundary time associated with a periodic schedule when v-UEs connected to a respective base station and participating in vehicle based communications over the network perform a disconnect procedure and a reattach procedure, where a different boundary time is set for each base station, and convey, to each base station of the set of base stations, an indication of the boundary time for the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
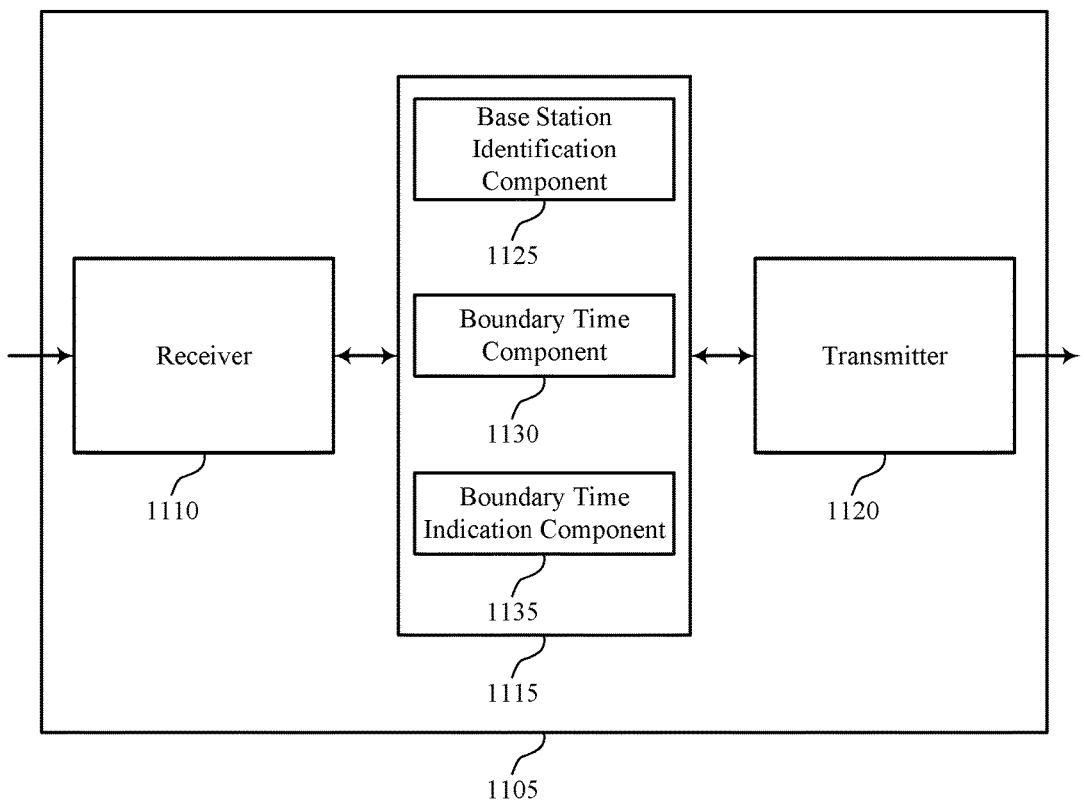

FIG. 11 shows a block diagram 1100 of a wireless device 1105 that supports V2X reattach timing in accordance with various aspects of the present disclosure. Wireless device 1105 may be an example of aspects of a wireless device 1005 or a network entity 130 as described with reference to FIGS. 1 through 5 and 10. Wireless device 1105 may include receiver 1110, network vehicle communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to V2X reattach timing, etc.). Information may be passed on to other components of the device. The receiver 1110 may be an example of aspects of the transceiver 1335 described with reference to FIG. 13.

Network vehicle communications manager 1115 may be an example of aspects of the Network vehicle communications manager 1315 described with reference to FIG. 13.

Network vehicle communications manager 1115 may also include base station identification component 1125, boundary time component 1130, and boundary time indication component 1135.

Base station identification component 1125 may identify a set of base stations that are associated with a network that supports vehicle based communications.

Boundary time component 1130 may set a boundary time for each base station of the set of base stations, the boundary time associated with a periodic schedule when v-UEs connected to a respective base station and participating in vehicle based communications over the network perform a disconnect procedure and a reattach procedure, where a different boundary time is set for each base station.

Boundary time indication component 1135 may convey, to each base station of the set of base stations, an indication of the boundary time for the base station.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
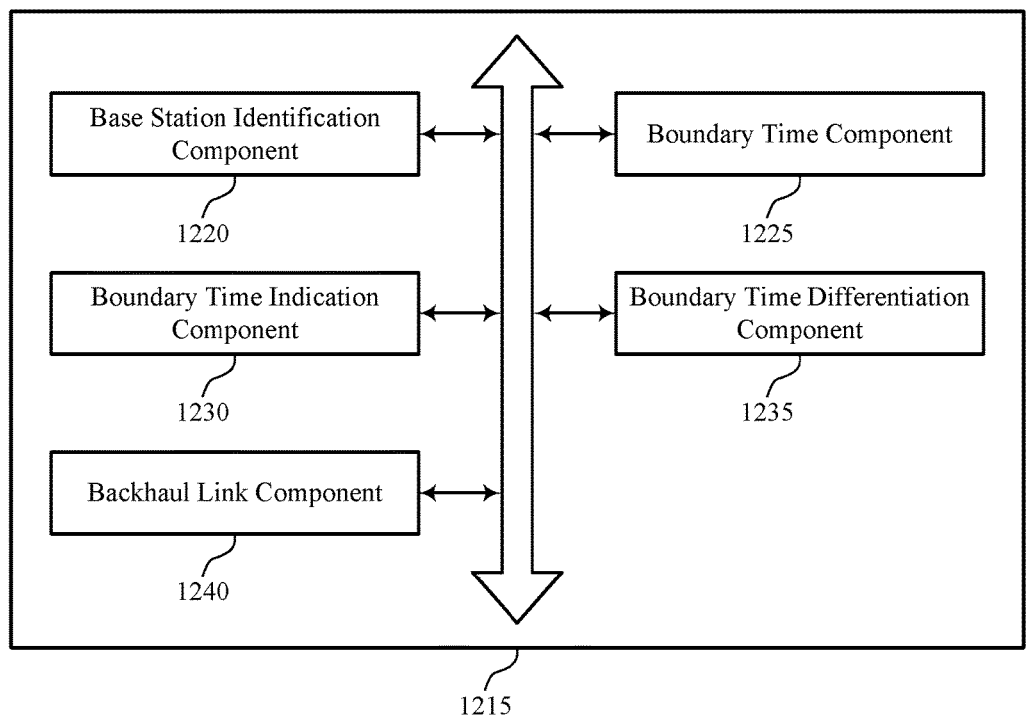

FIG. 12 shows a block diagram 1200 of a network vehicle communications manager 1215 that supports V2X reattach timing in accordance with various aspects of the present disclosure. The network vehicle communications manager 1215 may be an example of aspects of a network vehicle communications manager 1315 described with reference to FIGS. 10, 11, and 13. The network vehicle communications manager 1215 may include base station identification component 1220, boundary time component 1225, boundary time indication component 1230, boundary time differentiation component 1235, and backhaul link component 1240. Each of these modules may communicate, directly or indirectly, with one another (e.g., via one or more buses).

Base station identification component 1220 may identify a set of base stations that are associated with a network that supports vehicle based communications.

Boundary time component 1225 may set a boundary time for each base station of the set of base stations, the boundary time associated with a periodic schedule when v-UEs connected to a respective base station and participating in vehicle based communications over the network perform a disconnect procedure and a reattach procedure, where a different boundary time is set for each base station.

Boundary time indication component 1230 may convey, to each base station of the set of base stations, an indication of the boundary time for the base station.

Boundary time differentiation component 1235 may set a different boundary time for each base station of the set of base stations to maintain a load level on the network entity that is below a threshold load level.

Backhaul link component 1240 may convey the indication to each base station of the set of base stations via a backhaul link. In some cases, the backhaul link includes an S1 link.

Figure 13:
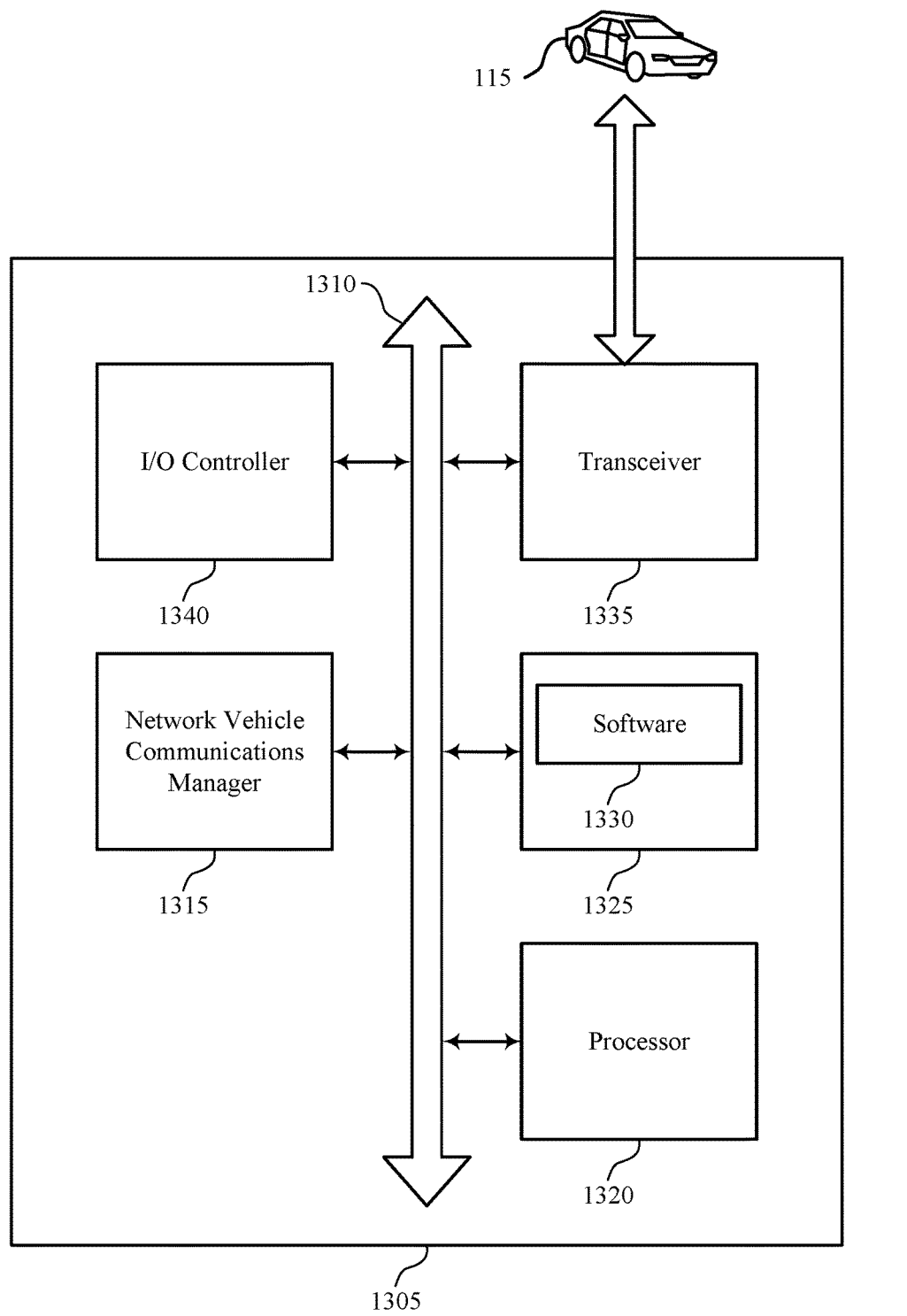
FIG. 13 illustrates a block diagram of a system including a network entity that supports vehicle-to-everything reattach timing in accordance with aspects of the present disclosure.

FIG. 13 shows a diagram of a system 1300 including a device 1305 that supports V2X reattach timing in accordance with various aspects of the present disclosure. Device 1305 may be an example of or include the components of network entity 130 as described above, e.g., with reference to FIGS. 1 through 5 and 10-12. Device 1305 may include components for bi-directional voice and data communications including components for transmitting and receiving communications, including network vehicle communications manager 1315, processor 1320, memory 1325, software 1330, transceiver 1335, and I/O controller 1340. These components may be in electronic communication via one or more busses (e.g., bus 1310).

Processor 1320 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting V2X reattach timing).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support V2X reattach timing. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

I/O controller 1340 may manage input and output signals for device 1305. I/O controller 1340 may also manage peripherals not integrated into device 1305. In some cases, I/O controller 1340 may represent a physical connection or port to an external peripheral. In some cases, I/O controller 1340 may utilize an operating system such as iOS®, ANDROID®, MS-DOS®, MS-WINDOWS®, OS/2®, UNIX®, LINUX®, or another known operating system.

Figure 14:
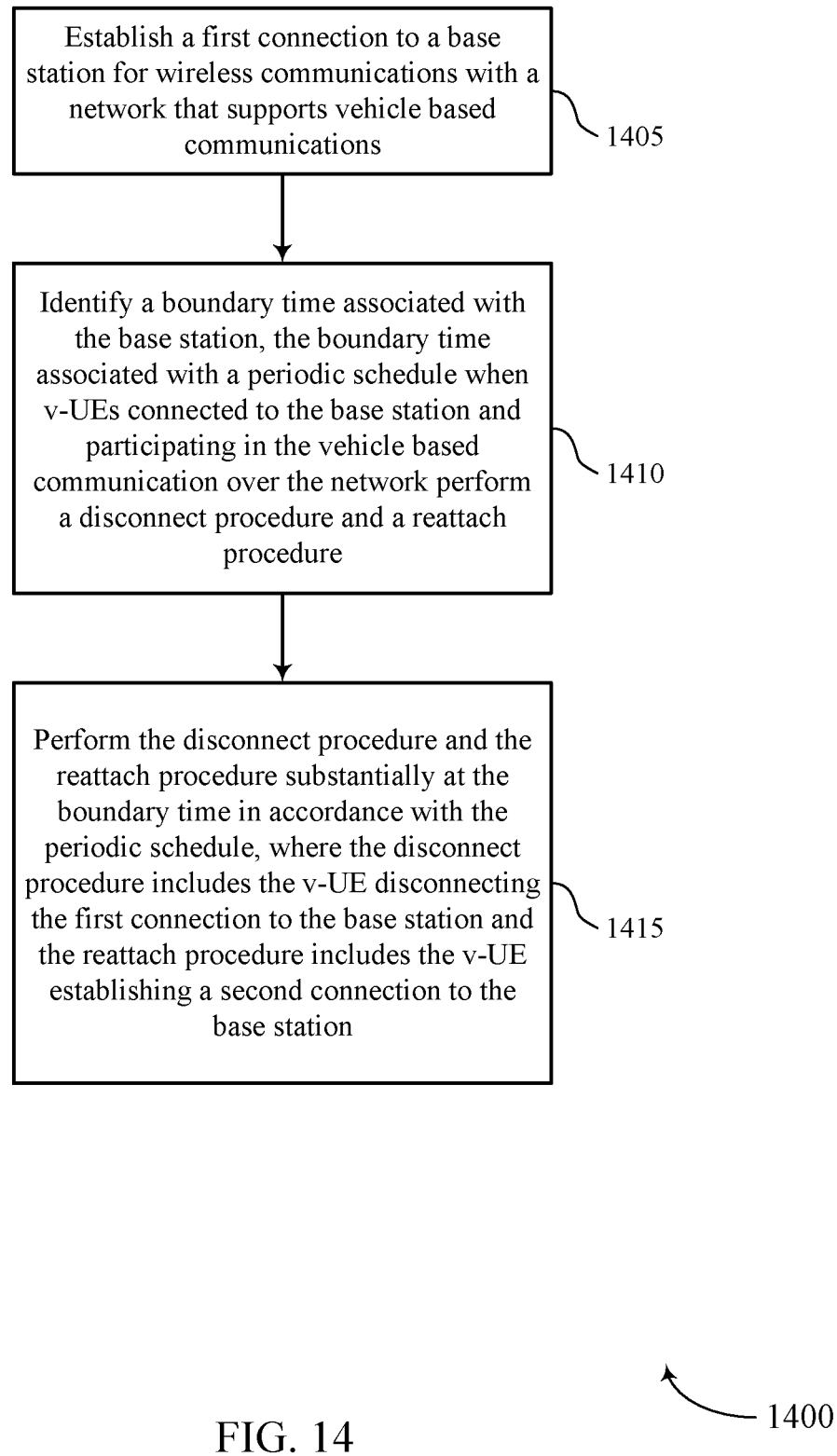
FIGS. 14 through 17 illustrate methods for vehicle-to-everything reattach timing in accordance with aspects of the present disclosure.

FIG. 14 shows a flowchart illustrating a method 1400 for V2X reattach timing in accordance with various aspects of the present disclosure. The operations of method 1400 may be implemented by a UE 115 or its components as described herein. For example, the operations of method 1400 may be performed by a UE vehicle communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may establish a first connection to a base station for wireless communications with a network that supports vehicle based communications. The operations of block 1405 may be performed according to the methods described with reference to FIGS. 1 through 5. In certain examples, aspects of the operations of block 1405 may be performed by a connection component as described with reference to FIGS. 6 through 9.

At block 1410 the UE 115 may identify a boundary time associated with the base station, the boundary time associated with a periodic schedule when v-UEs connected to the base station and participating in the vehicle based communication over the network perform a disconnect procedure and a reattach procedure. The operations of block 1410 may be performed according to the methods described with reference to FIGS. 1 through 5. In certain examples, aspects of the operations of block 1410 may be performed by a boundary time component as described with reference to FIGS. 6 through 9.

At block 1415 the UE 115 may perform the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station. The operations of block 1415 may be performed according to the methods described with reference to FIGS. 1 through 5. In certain examples, aspects of the operations of block 1415 may be performed by a disconnect component as described with reference to FIGS. 6 through 9.

Figure 15:
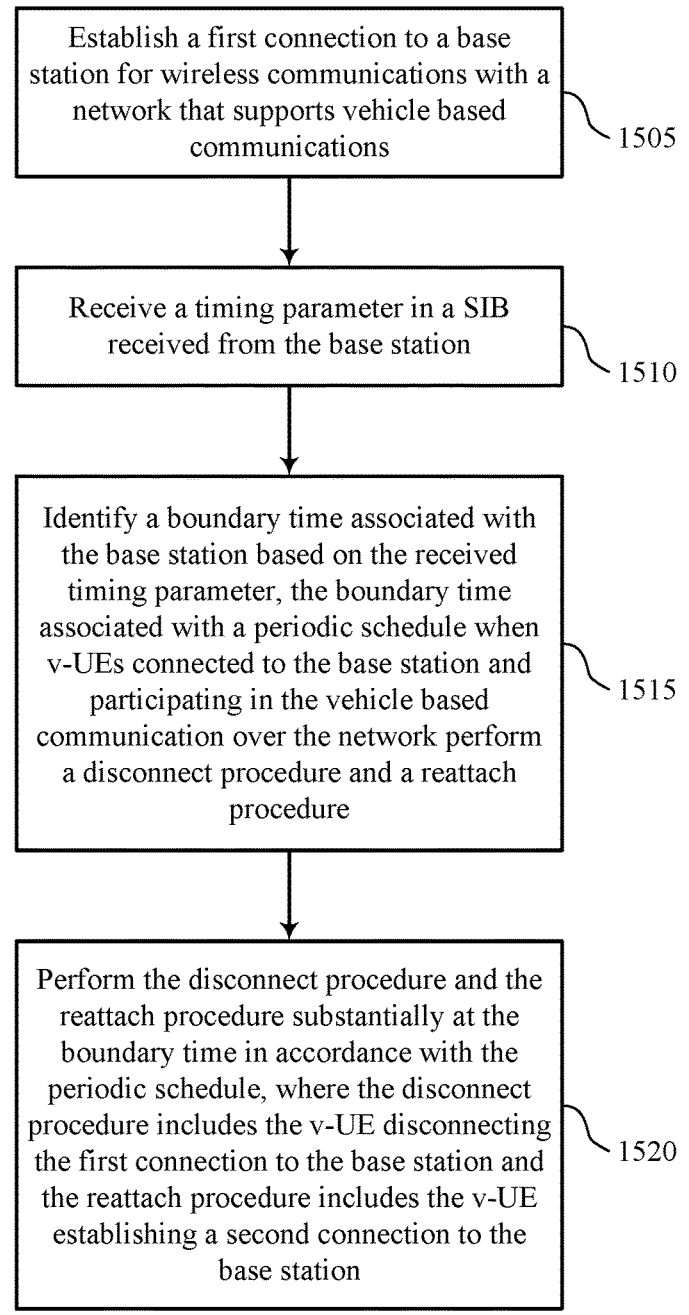

FIG. 15 shows a flowchart illustrating a method 1500 for V2X reattach timing in accordance with various aspects of the present disclosure. The operations of method 1500 may be implemented by a UE 115 or its components as described herein. For example, the operations of method 1500 may be performed by a UE vehicle communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may establish a first connection to a base station for wireless communications with a network that supports vehicle based communications. The operations of block 1505 may be performed according to the methods described with reference to FIGS. 1 through 5. In certain examples, aspects of the operations of block 1505 may be performed by a connection component as described with reference to FIGS. 6 through 9.

At block 1510 the UE 115 may receive a timing parameter in a SIB received from the base station. The operations of block 1510 may be performed according to the methods described with reference to FIGS. 1 through 5. In certain examples, aspects of the operations of block 1510 may be performed by a timing component as described with reference to FIGS. 6 through 9.

At block 1515 the UE 115 may identify a boundary time associated with the base station, the boundary time associated with a periodic schedule when v-UEs connected to the base station and participating in the vehicle based communication over the network perform a disconnect procedure and a reattach procedure. The UE 115 may identify the boundary time based at least in part on the received timing parameter. The operations of block 1515 may be performed according to the methods described with reference to FIGS. 1 through 5. In certain examples, aspects of the operations of block 1515 may be performed by a boundary time component as described with reference to FIGS. 6 through 9.

At block 1520 the UE 115 may perform the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station. The operations of block 1520 may be performed according to the methods described with reference to FIGS. 1 through 5. In certain examples, aspects of the operations of block 1520 may be performed by a disconnect component as described with reference to FIGS. 6 through 9.

Figure 16:
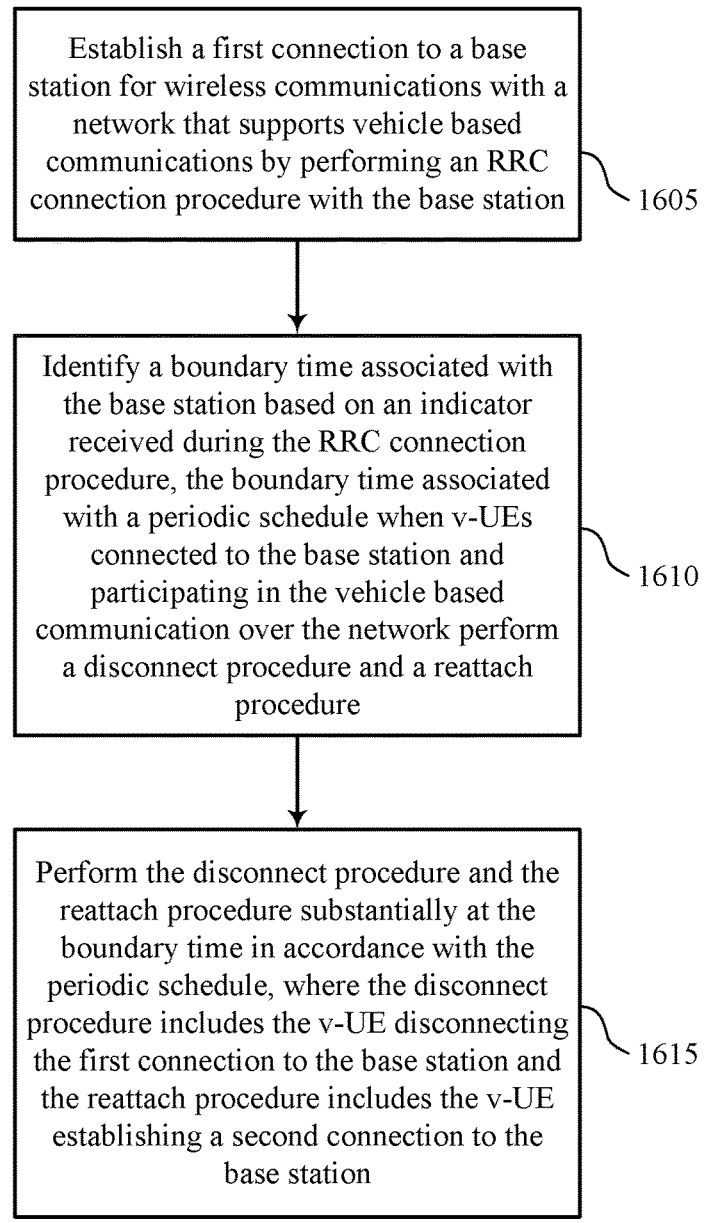

FIG. 16 shows a flowchart illustrating a method 1600 for V2X reattach timing in accordance with various aspects of the present disclosure. The operations of method 1600 may be implemented by a UE 115 or its components as described herein. For example, the operations of method 1600 may be performed by a UE vehicle communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may establish a first connection to a base station for wireless communications with a network that supports vehicle based communications. The UE 115 may perform a radio resource control (RRC) connection procedure with the base station to establish the first connection. The operations of block 1605 may be performed according to the methods described with reference to FIGS. 1 through 5. In certain examples, aspects of the operations of block 1605 may be performed by a connection component as described with reference to FIGS. 6 through 9.

At block 1610 the UE 115 may identify a boundary time associated with the base station, the boundary time associated with a periodic schedule when v-UEs connected to the base station and participating in the vehicle based communication over the network perform a disconnect procedure and a reattach procedure. The UE 115 may identify the boundary time based at least in part on an indicator received during the RRC connection procedure. The operations of block 1610 may be performed according to the methods described with reference to FIGS. 1 through 5. In certain examples, aspects of the operations of block 1610 may be performed by a boundary time component as described with reference to FIGS. 6 through 9.

At block 1615 the UE 115 may perform the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station. The operations of block 1615 may be performed according to the methods described with reference to FIGS. 1 through 5. In certain examples, aspects of the operations of block 1615 may be performed by a disconnect component as described with reference to FIGS. 6 through 9.

Figure 17:
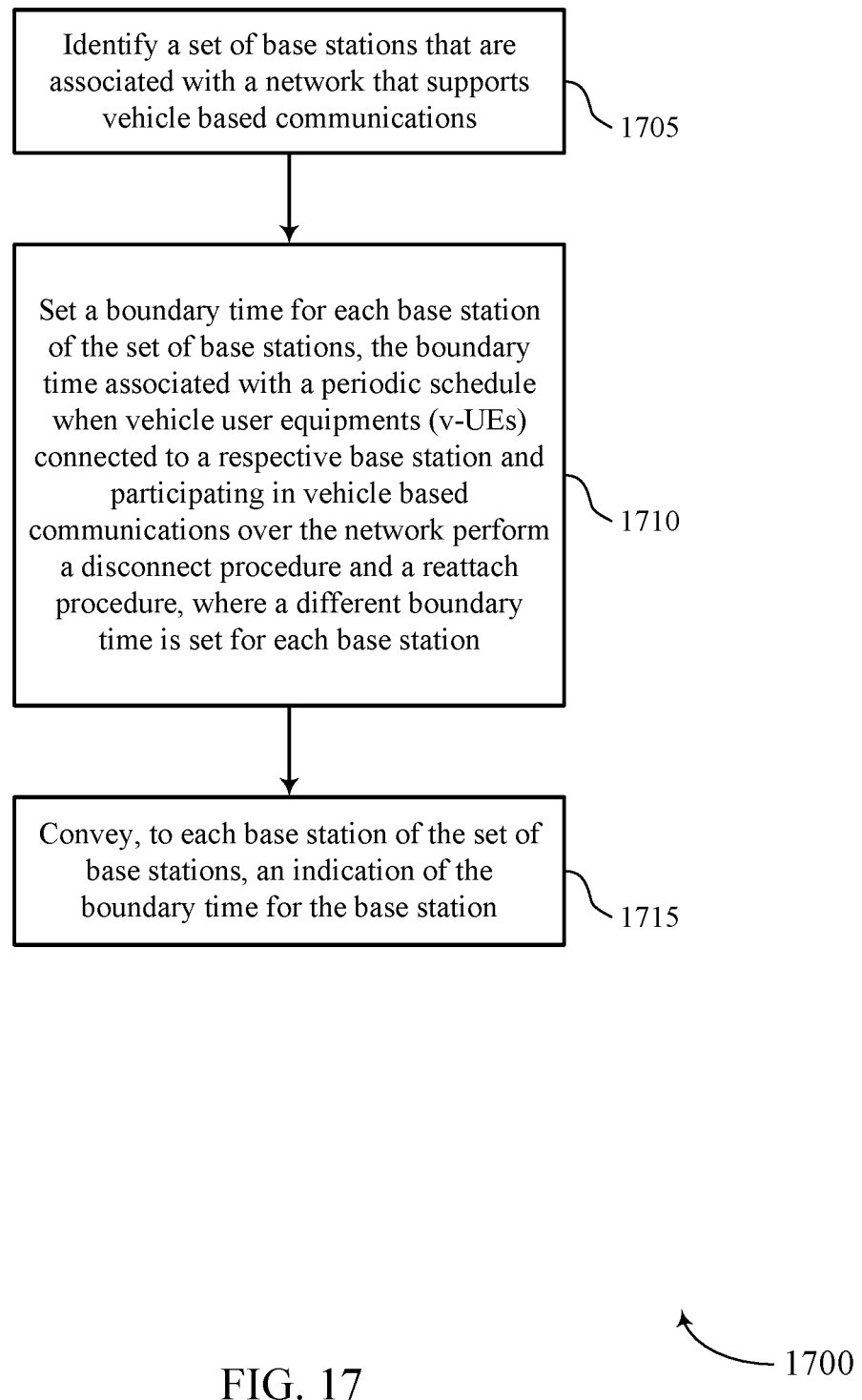

FIG. 17 shows a flowchart illustrating a method 1700 for V2X reattach timing in accordance with various aspects of the present disclosure. The operations of method 1700 may be implemented by a network entity 130 or its components as described herein. For example, the operations of method 1700 may be performed by a network vehicle communications manager as described with reference to FIGS. 10 through 13. In some examples, a network entity 130 may execute a set of codes to control the functional elements of the device to perform the functions described below. Additionally or alternatively, the network entity 130 may perform aspects of the functions described below using special-purpose hardware.

At block 1705 the network entity 130 may identify a set of base stations that are associated with a network that supports vehicle based communications. The operations of block 1705 may be performed according to the methods described with reference to FIGS. 1 through 5. In certain examples, aspects of the operations of block 1705 may be performed by a base station identification component as described with reference to FIGS. 10 through 13.

At block 1710 the network entity 130 may set a boundary time for each base station of the set of base stations, the boundary time associated with a periodic schedule when v-UEs connected to a respective base station and participating in vehicle based communications over the network perform a disconnect procedure and a reattach procedure, wherein a different boundary time is set for each base station. The operations of block 1710 may be performed according to the methods described with reference to FIGS. 1 through 5. In certain examples, aspects of the operations of block 1710 may be performed by a boundary time component as described with reference to FIGS. 10 through 13.

At block 1715 the network entity 130 may convey, to each base station of the set of base stations, an indication of the boundary time for the base station. The operations of block 1715 may be performed according to the methods described with reference to FIGS. 1 through 5. In certain examples, aspects of the operations of block 1715 may be performed by a boundary time indication component as described with reference to FIGS. 10 through 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a vehicle user equipment (v-UE), comprising:
    establishing a first connection to a base station for wireless communications with a network that supports vehicle based communications;
    identifying a boundary time associated with the base station, the boundary time associated with a periodic schedule when v-UEs connected to the base station and participating in the vehicle based communication over the network perform a disconnect procedure and a reattach procedure; and
    performing the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station.

2. The method of claim 1, further comprising:
    identifying a physical cell identifier (PCI) associated with the base station when establishing the first connection; and
    calculating the boundary time based at least in part on the identified PCI of the base station.

3. The method of claim 2, further comprising:
    receiving, from the base station, a timing parameter in a system information block (SIB); and
    calculating the boundary time based at least in part on the identified PCI and the received timing parameter, wherein the timing parameter comprises an indication of the boundary time or an indication of the periodic schedule associated with the base station.

4. The method of claim 1, further comprising:
    receiving a timing parameter in a system information block (SIB) received from the base station; and
    identifying the boundary time based at least in part on the received timing parameter.

5. The method of claim 4, wherein
    the SIB comprises configuration parameters for the network that supports vehicle based communications.

6. The method of claim 4, wherein
    the timing parameter comprises an indication of the boundary time and an indication of the periodic schedule associated with the base station.

7. The method of claim 1, further comprising:
    performing a radio resource control (RRC) connection procedure with the base station to establish the first connection; and
    identifying the boundary time based at least in part on an indicator received during the RRC connection procedure.

8. The method of claim 7, further comprising:
    receiving the indicator in an information element (IE) conveyed in an RRCConnectionReconfiguration message received during the RRC connection procedure.

9. The method of claim 7, wherein the indicator comprises a timing parameter associated with the boundary time, and wherein the timing parameter comprises an indication of the boundary time or an indication of the periodic schedule associated with the base station.

10. The method of claim 7, further comprising:
    transmitting an indication to the base station during the RRC connection procedure that the v-UE is using vehicle based communications over the network.

11. The method of claim 1, further comprising:
    using a first virtual v-UE identifier to establish the first connection to the base station; and
    using a second virtual v-UE identifier to establish the second connection to the base station.

12. The method of claim 1, wherein
    a different virtual v-UE identifier is used for each reattach procedure.

13. A method for wireless communication by a network entity, comprising:
    identifying a set of base stations that are associated with a network that supports vehicle based communications;
    setting a boundary time for each base station of the set of base stations, the boundary time associated with a periodic schedule when vehicle user equipments (v-UEs) connected to a respective base station and participating in vehicle based communications over the network perform a disconnect procedure and a reattach procedure, wherein a different boundary time is set for each base station; and
    conveying, to each base station of the set of base stations, an indication of the boundary time for the base station.

14. The method of claim 13, further comprising:
setting a different boundary time for each base station of the set of base stations maintains a load level on the network entity that is below a threshold load level.

15. The method of claim 13, further comprising:
conveying the indication to each base station of the set of base stations via a backhaul link.

16. The method of claim 15, wherein
the backhaul link comprises an S1 link.

17. An apparatus for wireless communication by a vehicle user equipment (v-UE), in a system comprising:
a processor;
memory in electronic communication with the processor; and
instructions stored in the memory and operable, when executed by the processor, to cause the apparatus to:
establish a first connection to a base station for wireless communications with a network that supports vehicle based communications;
identify a boundary time associated with the base station, the boundary time associated with a periodic schedule when v-UEs connected to the base station and participating in the vehicle based communication over the network perform a disconnect procedure and a reattach procedure; and
perform the disconnect procedure and the reattach procedure substantially at the boundary time in accordance with the periodic schedule, wherein the disconnect procedure comprises the v-UE disconnecting the first connection to the base station and the reattach procedure comprises the v-UE establishing a second connection to the base station.

18. The apparatus of claim 17, wherein the instructions are further executable by the processor to:
identify a physical cell identifier (PCI) associated with the base station when establishing the first connection; and
calculate the boundary time based at least in part on the identified PCI of the base station.

19. The apparatus of claim 18, wherein the instructions are further executable by the processor to:
receive, from the base station, a timing parameter in a system information block (SIB); and
calculate the boundary time based at least in part on the identified PCI and the received timing parameter, wherein the timing parameter comprises an indication of the boundary time or an indication of the periodic schedule associated with the base station.

20. The apparatus of claim 17, wherein the instructions are further executable by the processor to:
receive a timing parameter in a system information block (SIB) received from the base station; and
identify the boundary time based at least in part on the received timing parameter.

21. The apparatus of claim 20, wherein
the SIB comprises configuration parameters for the network that supports vehicle based communications.

22. The apparatus of claim 20, wherein
the timing parameter comprises an indication of the boundary time and an indication of the periodic schedule associated with the base station.

23. The apparatus of claim 17, wherein the instructions are further executable by the processor to:
perform a radio resource control (RRC) connection procedure with the base station to establish the first connection; and
identify the boundary time based at least in part on an indicator received during the RRC connection procedure.

24. The apparatus of claim 23, wherein the instructions are further executable by the processor to:
receive the indicator in an information element (IE) conveyed in an RRCConnectionReconfiguration message received during the RRC connection procedure.

25. The apparatus of claim 23, wherein the indicator comprises a timing parameter associated with the boundary time, and wherein the timing parameter comprises an indication of the boundary time or an indication of the periodic schedule associated with the base station.

26. The apparatus of claim 23, wherein the instructions are further executable by the processor to:
transmit an indication to the base station during the RRC connection procedure that the v-UE is using vehicle based communications over the network.

27. The apparatus of claim 17, wherein the instructions are further executable by the processor to:
us a first virtual v-UE identifier to establish the first connection to the base station; and
us a second virtual v-UE identifier to establish the second connection to the base station.

28. An apparatus for wireless communication by a network entity, in a system comprising:
a processor;
memory in electronic communication with the processor; and
instructions stored in the memory and operable, when executed by the processor, to cause the apparatus to:
identify a set of base stations that are associated with a network that supports vehicle based communications;
set a boundary time for each base station of the set of base stations, the boundary time associated with a periodic schedule when vehicle user equipments (v-UEs) connected to a respective base station and participating in vehicle based communications over the network perform a disconnect procedure and a reattach procedure, wherein a different boundary time is set for each base station; and
convey, to each base station of the set of base stations, an indication of the boundary time for the base station.

29. The apparatus of claim 28, wherein the instructions are further executable by the processor to:
set a different boundary time for each base station of the set of base stations maintains a load level on the network entity that is below a threshold load level.

30. The apparatus of claim 28, wherein the instructions are further executable by the processor to:
convey the indication to each base station of the set of base stations via a backhaul link.

* * * * *